(12) United States Patent
Hawes et al.

(10) Patent No.: US 11,871,784 B2
(45) Date of Patent: *Jan. 16, 2024

(54) AIR INTAKE ASSEMBLY

(71) Applicant: Altria Client Services LLC, Richmond, VA (US)

(72) Inventors: Eric Hawes, Midlothian, VA (US); Raymond W. Lau, Richmond, VA (US); Mik Dahl, Lapu-Lapu (PH); Jon Jarantilla, Lapu-Lapu (PH); Galen Salvador, Lapu-Lapu (PH); Jose Jesus Paolo Montalvan, Mandaue (PH); Jeroen Kok, Amsterdam (NL)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/706,949

(22) Filed: Mar. 29, 2022

(65) Prior Publication Data

US 2022/0211105 A1 Jul. 7, 2022

Related U.S. Application Data

(63) Continuation of application No. 16/196,866, filed on Nov. 20, 2018, now Pat. No. 11,311,049.

(51) Int. Cl.
*A24F 40/40* (2020.01)
*A24F 40/50* (2020.01)
*A24F 40/42* (2020.01)

(52) U.S. Cl.
CPC .............. *A24F 40/40* (2020.01); *A24F 40/42* (2020.01); *A24F 40/50* (2020.01)

(58) Field of Classification Search
CPC .................................. A24F 40/50; A24F 40/42
See application file for complete search history.

(56) References Cited

U.S. PATENT DOCUMENTS 9,247,773 B2   2/2016   Memari et al.
9,254,007 B2   2/2016   Liu
(Continued)

FOREIGN PATENT DOCUMENTS

CN   203538369 U   4/2014
CN   203748684 U   8/2014
(Continued)

OTHER PUBLICATIONS

European Office Action dated Jun. 17, 2022 for corresponding European Application No. 19809744.6.
(Continued)

*Primary Examiner* — Kelly M Gambetta
*Assistant Examiner* — Jennifer A Kessie
(74) *Attorney, Agent, or Firm* — Harness, Dickey & Pierce, P.L.C.

(57) ABSTRACT

A vapor generator assembly for an e-vaping device may include a reservoir configured to hold a pre-vapor formulation, a vaporizer assembly configured to heat pre-vapor formulation drawn from the reservoir to form a vapor, and an air intake assembly configured to direct ambient air into the vaporizer assembly. The air intake assembly may at least partially define an air inlet that extends at least partially around an outer surface of the vapor generator assembly. The air inlet may be an arcuate air inlet or an annular air inlet. The air intake assembly may at least partially define an inlet channel extending from the air inlet into an interior of the vapor generator assembly to at least partially establish fluid communication between the arcuate air inlet and the vaporizer assembly. The inlet channel may extend coaxially in relation to a longitudinal axis of the vapor generator assembly.

8 Claims, 19 Drawing Sheets

(56) References Cited

U.S. PATENT DOCUMENTS

| | | |
|---|---|---|
| 9,308,336 B2 | 4/2016 | Newton |
| 9,750,282 B2 | 9/2017 | Liu |
| 9,795,169 B1 | 10/2017 | Zhu |
| 9,814,264 B2 | 11/2017 | Coelho Belo Fernandes De Carvalho |
| 9,907,341 B1 | 3/2018 | Zhu |
| 9,961,942 B2 | 5/2018 | Liu |
| 9,993,025 B2 | 6/2018 | Alarcon et al. |
| 2014/0290674 A1 | 10/2014 | Liu |
| 2015/0128971 A1 | 5/2015 | Verleur et al. |
| 2015/0196055 A1 | 7/2015 | Liu |
| 2015/0335071 A1 | 11/2015 | Brinkley et al. |
| 2016/0007654 A1 | 1/2016 | Zhu |
| 2016/0073692 A1 | 3/2016 | Alarcon et al. |
| 2016/0095357 A1 | 4/2016 | Burton |
| 2016/0120226 A1 | 5/2016 | Rado |
| 2016/0120227 A1 | 5/2016 | Levitz et al. |
| 2016/0157522 A1 | 6/2016 | Zhu |
| 2016/0219938 A1 | 8/2016 | Mamoun et al. |
| 2016/0262452 A1 | 9/2016 | Zhu |
| 2016/0286860 A1 | 10/2016 | Flayler |
| 2017/0001854 A1 | 1/2017 | Li et al. |
| 2017/0013880 A1 | 1/2017 | O'Brien et al. |
| 2017/0027227 A1 | 2/2017 | Lipowicz |
| 2017/0065001 A1 | 3/2017 | Li et al. |
| 2017/0071251 A1 | 3/2017 | Goch |
| 2017/0105451 A1 | 4/2017 | Fornarelli |
| 2017/0113007 A1 | 4/2017 | Wu |
| 2017/0156408 A1 | 6/2017 | Li et al. |
| 2017/0188636 A1 | 7/2017 | Li et al. |
| 2017/0208869 A1 | 7/2017 | Li et al. |
| 2017/0238614 A1 | 8/2017 | Li et al. |
| 2017/0280778 A1 | 10/2017 | Force |
| 2017/0290370 A1 | 10/2017 | Garthaffner et al. |
| 2017/0325503 A1 | 11/2017 | Liu |
| 2017/0347705 A1 | 12/2017 | Li |
| 2017/0354180 A1 | 12/2017 | Fornarelli |
| 2018/0007961 A1 | 1/2018 | Zhu |
| 2018/0007966 A1 | 1/2018 | Li et al. |
| 2018/0020726 A1 | 1/2018 | Alarcon et al. |
| 2018/0035718 A1 | 2/2018 | Liu |
| 2018/0077967 A1 | 3/2018 | Hatton et al. |
| 2018/0077968 A1 | 3/2018 | Qiu |
| 2018/0098573 A1 | 4/2018 | Yu et al. |
| 2018/0098575 A1 | 4/2018 | Liu |
| 2018/0110940 A1 | 4/2018 | Suzuki et al. |
| 2018/0168236 A1 | 6/2018 | Qiu |
| 2018/0199631 A1 | 7/2018 | Chen et al. |
| 2018/0279691 A1 | 10/2018 | Li et al. |
| 2018/0280636 A1 | 10/2018 | Jiang et al. |

FOREIGN PATENT DOCUMENTS

| | | |
|---|---|---|
| CN | 104082863 A | 10/2014 |
| CN | 203851819 U | 10/2014 |
| CN | 203860454 U | 10/2014 |
| CN | 203860455 U | 10/2014 |
| CN | 104207330 A | 12/2014 |
| CN | 203986123 U | 12/2014 |
| CN | 204048044 U | 12/2014 |
| CN | 204104840 U | 1/2015 |
| CN | 104544568 A | 4/2015 |
| CN | 204861175 U | 12/2015 |
| CN | 204994614 U | 1/2016 |
| CN | 105310112 A | 2/2016 |
| CN | 205082671 U | 3/2016 |
| CN | 105722417 A | 6/2016 |
| CN | 105768236 A | 7/2016 |
| CN | 205390305 U | 7/2016 |
| CN | 105815810 A | 8/2016 |
| CN | 105942581 A | 9/2016 |
| CN | 205695706 U | 11/2016 |
| CN | 106231937 A | 12/2016 |
| CN | 205865989 U | 1/2017 |
| CN | 106418714 A | 2/2017 |
| CN | 106666833 A | 5/2017 |
| CN | 107095346 A | 8/2017 |
| CN | 206380711 U | 8/2017 |
| CN | 206413751 U | 8/2017 |
| CN | 206453250 U | 9/2017 |
| CN | 206534130 U | 10/2017 |
| CN | 107373758 A | 11/2017 |
| CN | 107411173 A | 12/2017 |
| CN | 107411176 A | 12/2017 |
| CN | 206808661 U | 12/2017 |
| CN | 206866629 U | 1/2018 |
| CN | 206978739 U | 2/2018 |
| CN | 206978745 U | 2/2018 |
| CN | 207040881 U | 2/2018 |
| CN | 207100510 U | 3/2018 |
| CN | 207167762 U | 4/2018 |
| CN | 207185918 U | 4/2018 |
| CN | 207252783 U | 4/2018 |
| CN | 107981418 A | 5/2018 |
| CN | 207306063 U | 5/2018 |
| CN | 207306075 U | 5/2018 |
| CN | 207306079 U | 5/2018 |
| DE | 202014001717 U1 | 5/2015 |
| DE | 102015102894 A1 | 8/2015 |
| EP | 2856892 A1 | 4/2015 |
| EP | 3031339 A1 | 6/2016 |
| EP | 3254571 A1 | 12/2017 |
| EP | 3275322 A1 | 1/2018 |
| EP | 3305110 A2 | 4/2018 |
| EP | 3338571 A2 | 6/2018 |
| KR | 2016-0086749 A | 7/2016 |
| RU | 2608689 C1 | 1/2017 |
| RU | 2614600 C2 | 3/2017 |
| RU | 2623922 C2 | 6/2017 |
| RU | 2665451 C1 | 8/2018 |
| WO | WO-2014/187770 A2 | 11/2014 |
| WO | WO-2014201432 A1 | 12/2014 |
| WO | WO-2015/062136 A1 | 5/2015 |
| WO | WO-2015/117704 A1 | 8/2015 |
| WO | WO-2016/008217 A1 | 1/2016 |
| WO | WO-2016/045058 A1 | 3/2016 |
| WO | WO-2016/096745 A1 | 6/2016 |
| WO | WO-2016/096780 A1 | 6/2016 |
| WO | WO-2016090426 A1 | 6/2016 |
| WO | WO-2016119098 A1 | 8/2016 |
| WO | WO-2016/145612 A1 | 9/2016 |
| WO | WO-2016141508 A1 | 9/2016 |
| WO | WO-2016145613 A1 | 9/2016 |
| WO | WO-2016/154994 A1 | 10/2016 |
| WO | WO-2016/155103 A1 | 10/2016 |
| WO | WO-2016201602 A1 | 12/2016 |
| WO | WO-2017033132 A1 | 3/2017 |
| WO | WO-2017063535 A1 | 4/2017 |
| WO | WO-2017113513 A1 | 7/2017 |
| WO | WO-2017118135 A1 | 7/2017 |
| WO | WO-2017124334 A1 | 7/2017 |
| WO | WO-2017156733 A1 | 9/2017 |
| WO | WO-2017190602 A1 | 11/2017 |
| WO | WO-2018/007633 A1 | 1/2018 |

OTHER PUBLICATIONS

Anonymous: "iJust 2 Airflow Control Ring." Retrieved from the Internet on Nov. 16, 2018. URL: https://www.eleafus.com/ijust-2-airflow-control-ring.html.

Anonymous: "Newest Hurricane RTA Atomizer Adjustable Airflow E-Phoenix Hurricane RBA Tank VS Fire Bird Goblin Mini Kayfun V3 Mini Vaporizers DHL." Retrieved from the Internet Nov. 16, 2018. URL: https://www.dhgate.com/product/newest-hurricane-rta-atomizer-adjustable/377737091.html.

Anonymous: "China eCig Supplier Elego Wholesale Huge Vapor Starter Kit 2200mah Yocan X-linx." Retrieved from the Internet Nov. 16, 2018. URL: https://www.alibaba.com/product-detail/China-eCig-Supplier-Elego-Wholesale-Huge_60332730872.html?spm=a2700.7724857.normalList.5.785a140b%E2%80%A6.

Anonymous: "ShenRay TAE Adjustable Airflow Atomizer 5ml Capacity Vaporizer 25mm RTA Electronic Cigarette rta Vape."

(56) References Cited

OTHER PUBLICATIONS

Retrieved from the Internet Nov. 16, 2018. URL: https://www.aliexpress.com/item/ShenRay-TAE-Adjustable-Airflow-Atomizer-5ml-Capacity-Vaporizer-25mm-RTA-Electronic-Cigarette-rta-Vape/328461%E2%80%A6.
Anonymous: "OBS T-VCT Sub Ohm Tank E-Cigarette 6ml RBA Atomizer with 0.25o." Retrieved from the internet Nov. 16, 2018. URL: https://www.gearbest.com/electronic-cigarettes/pp_187373.html.
Anonymous: "SER Little 16mm RDA Atomizer—Silver." Retrieved from the internet Nov. 16, 2018. URL: https://www.gearbest.com/vapor-styles/pp_618116.html.
Anonymous: "Authentic Aspire Mini Nautilus E-Cigarette Atomizer Kit—Silver." Retrieved from the Internet Nov. 16, 2018. URL: https://www.gearbest.com/electronic-cigarettes/pp_104356.html.
International Search Report and Written Opinion thereof dated Feb. 24, 2020 for corresponding International Application No. PCT/EP2019/081972.
International Search Report and Written Opinion thereof dated Feb. 19, 2020 for corresponding International Application No. PCT/EP2019/081987.
International Search Report and Written Opinion thereof dated Feb. 19, 2020 for corresponding International Application No. PCT/EP2019/081985.
International Search Report and Written Opinion thereof dated Feb. 14, 2020 for corresponding International Application No. PCT/EP2019/081970.
Written Opinion dated Oct. 22, 2020 for corresponding International Application No. PCT/EP2019/081985.
U.S. Office Action dated Oct. 28, 2020 for corresponding U.S. Appl. No. 16/196,344.
U.S. Office Action dated Nov. 5, 2020 for corresponding U.S. Appl. No. 16/196,219.
Written Opinion dated Nov. 3, 2020 for corresponding International Application No. PCT/EP2019/081970.
U.S. Office Action dated Nov. 23, 2020 for corresponding U.S. Appl. No. 16/196,749.
International Preliminary Report on Patentability dated Feb. 16, 2021 for corresponding International Application No. PCT/EP2019/081985.
International Preliminary Report on Patentability dated Mar. 5, 2021 for corresponding International Application No. PCT/EP2019/081970.
U.S. Office Action dated Mar. 31, 2021 for corresponding U.S. Appl. No. 16/196,344.
U.S. Notice of Allowance dated Apr. 1, 2021 for corresponding U.S. Appl. No. 16/196,219.
U.S. Notice of Allowance dated Apr. 14, 2021 for corresponding U.S. Appl. No. 16/196,749.
U.S. Office Action dated May 10, 2021 for U.S. Appl. No. 16/196,866.
U.S. Notice of Allowance dated Jun. 3, 2021 for corresponding U.S. Appl. No. 16/196,219.
International Preliminary Report on Patentability dated May 25, 2021 for corresponding International Application No. PCT/EP2019/081987.
U.S. Office Action dated Nov. 19, 2021 for corresponding U.S. Appl. No. 16/196,344.
U.S. Notice of Allowance dated Dec. 29, 2021 for corresponding U.S. Appl. No. 16/196,866.
U.S. Notice of Allowance dated Feb. 17, 2022 for corresponding U.S. Appl. No. 16/196,749.
U.S. Notice of Allowance dated May 25, 2022 for corresponding U.S. Appl. No. 16/196,344.
Chinese Office Action dated Nov. 22, 2022 for corresponding Chinese Application No. 201980071035.5, and English-language translation thereof.
Russian Office Action dated Mar. 1, 2023 for corresponding Russian Application No. 2021111751, and English-language translation thereof.
Russian Office Action and Search Report dated Mar. 1, 2023 for corresponding Russian Application No. 2021111752, and English-language translation thereof.
Russian Office Action and Search Report dated Mar. 9, 2023 for corresponding Russian Application No. 2021116149, and English-language translation thereof.
Russian Notice of Allowance dated May 2, 2023 for corresponding Russian Application No. 2021116835, and English-language translation thereof.
Russian Notice of Allowance dated Jun. 9, 2023 for corresponding Russian Application No. 2021111751, and English-language translation thereof.
Chinese Office Action dated Jun. 9, 2023 for corresponding Chinese Application No. 201980071035.5, and English-language translation thereof.
Brazilian Office Action dated Jul. 4, 2023 for corresponding Brazilian Application No. 1120210087907, and English-language translation thereof.
Russian Notice of Allowance dated Aug. 1, 2023 for corresponding Russian Application No. 2021111752, and English-language translation thereof.
Russian Notice of Allowance dated Aug. 7, 2023 for corresponding Russian Application No. 2021116149, and English-language translation thereof.
Brazilian Office Action dated Aug. 1, 2023 for corresponding Brazilian Application No. 1120210074538, and English-language translation thereof.
Brazilian Office Action dated Aug. 1, 2023 for corresponding Brazilian Application No. 1120210072020, and English-language translation thereof.
Chinese Office Action and Search Report dated Sep. 7, 2023 for corresponding Chinese Application No. 201980071056.7, and English-language translation thereof.
Chinese Office Action dated Oct. 11, 2023 for corresponding Chinese Application No. 201980071064.1, and English-language translation thereof.

AIR INTAKE ASSEMBLY

CROSS REFERENCE TO RELATED APPLICATION

This application is a continuation application of U.S. application Ser. No. 16/196,866, filed Nov. 20, 2018, the entire contents of which are incorporated herein by reference.

BACKGROUND

Field

Example embodiments relate to electronic vaping devices, e-vaping devices, or the like.

Description of Related Art

E-vaping devices, also referred to herein as electronic vaping devices (EVDs) may be used by adult vapers for fluid portable vaping. An e-vaping device may include a reservoir that holds pre-vapor formulation and a vaporizer assembly that may heat pre-vapor formulation drawn from the reservoir to generate a vapor.

SUMMARY

According to some example embodiments, a vapor generator assembly for an e-vaping device may include a reservoir configured to hold a pre-vapor formulation, a vaporizer assembly configured to heat pre-vapor formulation drawn from the reservoir to form a vapor, and an air intake assembly configured to direct ambient air into the vaporizer assembly. The air intake assembly may at least partially define an arcuate air inlet that extends at least partially around an outer surface of the vapor generator assembly. The air intake assembly may at least partially define an inlet channel extending from the arcuate air inlet into an interior of the vapor generator assembly to at least partially establish fluid communication between the arcuate air inlet and the vaporizer assembly, the inlet channel extending coaxially in relation to a longitudinal axis of the vapor generator assembly.

The arcuate air inlet may be at least partially defined by an arcuate gap between the air intake assembly and an outer housing of the vapor generator assembly.

The vapor generator assembly may further include an airflow conduit extending between the inlet channel of the air intake assembly and the vaporizer assembly, such that the inlet channel is configured to establish fluid communication between the arcuate air inlet and the vaporizer assembly via the airflow conduit. The vapor generator assembly may further include a flow control structure including a plurality of orifices having different sizes. The flow control structure may be configured to adjustably align a selected orifice of the plurality of orifices with the airflow conduit to adjustably control a cross-sectional flow area associated with the airflow conduit.

The flow control structure may include an adjustment ring structure configured to be rotated around the longitudinal axis of the vapor generator assembly to adjustably align the selected orifice with the airflow conduit.

The air intake assembly may include the flow control structure.

The arcuate air inlet may be an annular air inlet that extends around an entirety of the outer surface of the vapor generator assembly.

The inlet channel may be an annular channel.

According to some example embodiments, a vapor generator assembly for an e-vaping device may include a reservoir configured to hold a pre-vapor formulation, a vaporizer assembly configured to heat pre-vapor formulation drawn from the reservoir to form a vapor, and an air intake assembly configured to direct ambient air into the vaporizer assembly. The air intake assembly may at least partially define an annular air inlet that extends around an entirety of an outer surface of the vapor generator assembly. The air intake assembly may at least partially define an inlet channel extending from the annular air inlet into an interior of the vapor generator assembly to at least partially establish fluid communication between the annular air inlet and the vaporizer assembly.

The annular air inlet may be at least partially defined by an annular gap between the air intake assembly and an outer housing of the vapor generator assembly.

The vapor generator assembly may include an airflow conduit extending between the inlet channel of the air intake assembly and the vaporizer assembly, such that the inlet channel is configured to establish fluid communication between the annular air inlet and the vaporizer assembly via the airflow conduit. The vapor generator assembly may include a flow control structure including a plurality of orifices having different sizes. The flow control structure may be configured to adjustably align a selected orifice of the plurality of orifices with the airflow conduit to adjustably control a cross-sectional flow area associated with the airflow conduit.

The flow control structure may be an adjustment ring configured to be rotated around a longitudinal axis of the vapor generator assembly to adjustably align the selected orifice with the airflow conduit.

The air intake assembly may include the flow control structure.

The inlet channel may extend coaxially in relation to a longitudinal axis of the vapor generator assembly.

According to some example embodiments, an e-vaping device may include a reservoir configured to hold a pre-vapor formulation, a vaporizer assembly configured to heat pre-vapor formulation drawn from the reservoir to form a vapor, an air intake assembly configured to direct ambient air into the vaporizer assembly, and a power supply assembly configured to supply electrical power to the vaporizer assembly. The air intake assembly may at least partially define an arcuate air inlet that extends at least partially around an outer surface of the vapor generator assembly. The air intake assembly may at least partially define an inlet channel extending from the arcuate air inlet into an interior of the vapor generator assembly to at least partially establish fluid communication between the arcuate air inlet and the vaporizer assembly, the inlet channel extending coaxially in relation to a longitudinal axis of the vapor generator assembly.

The arcuate air inlet may be at least partially defined by an arcuate gap between the air intake assembly and an outer housing of the e-vaping device.

The e-vaping device may include an airflow conduit extending between the inlet channel of the air intake assembly and the vaporizer assembly, such that the inlet channel is configured to establish fluid communication between the arcuate air inlet and the vaporizer assembly via the airflow conduit. The e-vaping device may include a flow control structure including a plurality of orifices having different sizes. The flow control structure may be configured to adjustably align a selected orifice of the plurality of orifices with the airflow conduit to adjustably control a cross-sectional flow area associated with the airflow conduit.

The flow control structure may be an adjustment ring configured to be rotated around the longitudinal axis of the e-vaping device to adjustably align the selected orifice with the airflow conduit.

The air intake assembly may include the flow control structure.

The arcuate air inlet may be an annular air inlet that extends around an entirety of the outer surface of the e-vaping device.

The inlet channel may be an annular channel.

The e-vaping device may include a vapor generator assembly. The vapor generator assembly may include the reservoir and the vaporizer assembly. The power supply assembly may be detachably coupled to the vapor generator assembly.

The power supply assembly may include a rechargeable battery.

According to some example embodiments, an e-vaping device may include a reservoir configured to hold a pre-vapor formulation, a vaporizer assembly configured to heat pre-vapor formulation drawn from the reservoir to form a vapor, an air intake assembly configured to direct ambient air into the vaporizer assembly, and a power supply assembly configured to supply electrical power to the vaporizer assembly. The air intake assembly may at least partially define an annular air inlet that extends around an entirety of an outer surface of the e-vaping device, and an inlet channel extending from the annular air inlet into an interior of the e-vaping device to at least partially establish fluid communication between the annular air inlet and the vaporizer assembly.

The annular air inlet may be at least partially defined by an annular gap between the air intake assembly and an outer housing of the e-vaping device.

The e-vaping device may include an airflow conduit extending between the inlet channel of the air intake assembly and the vaporizer assembly, such that the inlet channel is configured to establish fluid communication between the annular air inlet and the vaporizer assembly via the airflow conduit. The e-vaping device may include a flow control structure including a plurality of orifices having different sizes. The flow control structure may be configured to adjustably align a selected orifice of the plurality of orifices with the airflow conduit to adjustably control a cross-sectional flow area associated with the airflow conduit.

The flow control structure may be an adjustment ring configured to be rotated around a longitudinal axis of the e-vaping device to adjustably align the selected orifice with the airflow conduit.

The air intake assembly may include the flow control structure.

The inlet channel may extend coaxially in relation to a longitudinal axis of the e-vaping device.

The e-vaping device may include a vapor generator assembly, the vapor generator assembly including the reservoir and the vaporizer assembly. The power supply assembly may be detachably coupled to the vapor generator assembly.

The power supply assembly may include a rechargeable battery.

BRIEF DESCRIPTION OF THE DRAWINGS

The various features and advantages of the non-limiting example embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1A:
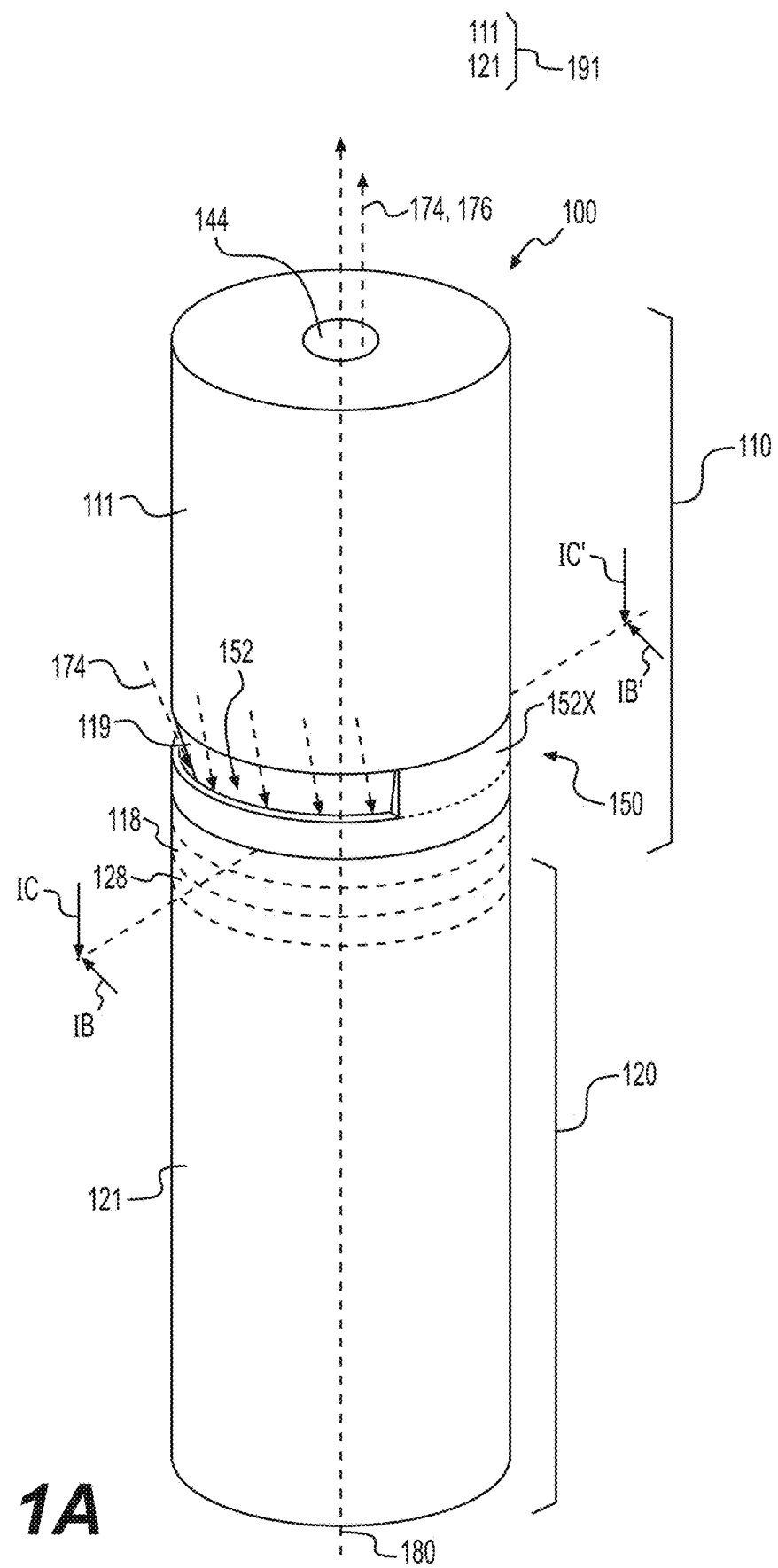
FIG. 1A is a perspective view of an e-vaping device according to some example embodiments.

Some detailed example embodiments are disclosed herein. However, specific structural and functional details disclosed herein are merely provided for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives thereof. Like numbers refer to like elements throughout the description of the figures.

It should be understood that when an element or layer is referred to as being "on," "connected to," "coupled to," "attached to," "adjacent to," or "covering" another element or layer, it may be directly on, connected to, coupled to, attached to, adjacent to or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations or sub-combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, etc., but do not preclude the presence or addition of one or more other features, integers, steps, operations, elements, etc., and/or groups thereof.

When the words "about" and "substantially" are used in this specification in connection with a numerical value, it is intended that the associated numerical value include a tolerance of ±10% around the stated numerical value, unless otherwise explicitly defined.

Example embodiments are described herein with reference to cross-sectional illustrations that are schematic illustrations of example embodiments. As such, variations from the shapes of the illustrations are to be expected. Thus, example embodiments should not be construed as limited to the shapes of regions illustrated herein but are to include deviations in shapes.

Vapor, aerosol and dispersion are used interchangeably and are meant to cover the matter generated or outputted by the devices disclosed, claimed and/or equivalents thereof.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Hardware may be implemented using processing or control circuitry such as, but not limited to, one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Figure 1B:
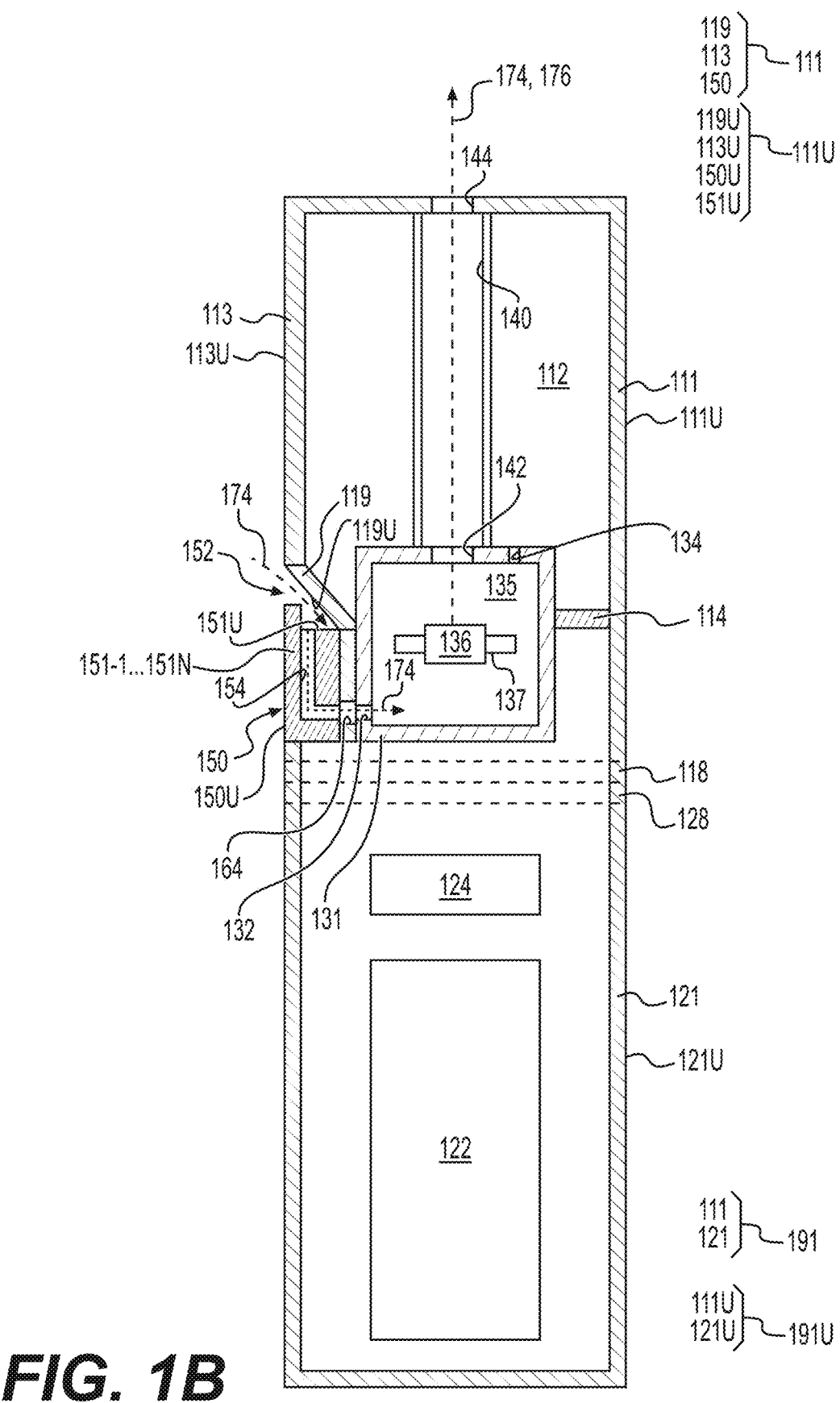
FIG. 1B is a cross-sectional view along line IB-IB' of the e-vaping device of FIG. 1A according to some example embodiments.
Figure 1C:
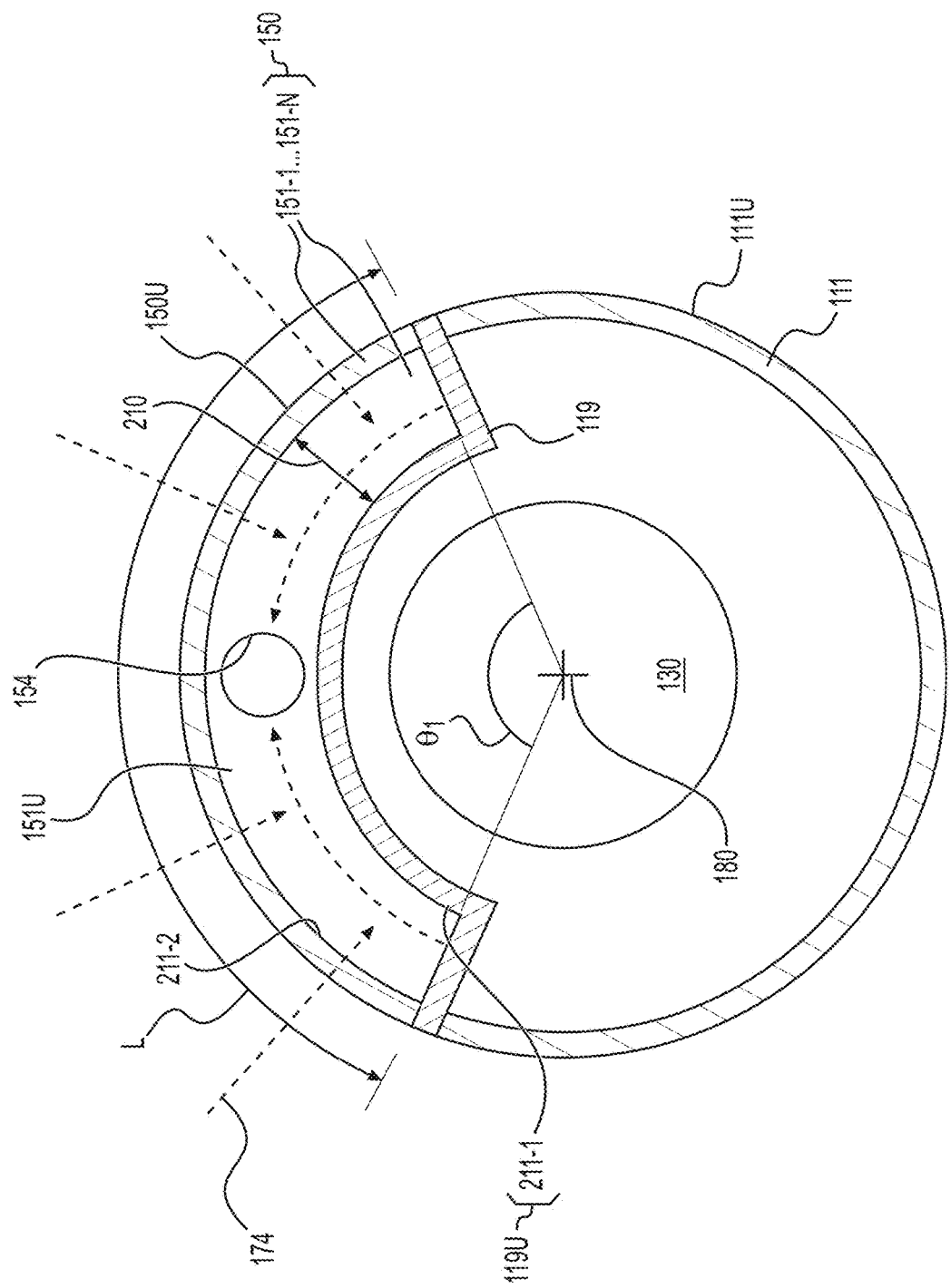
FIG. 1C is a cross-sectional view along line IC-IC' of the e-vaping device of FIG. 1A according to some example embodiments.
Figure 1D:
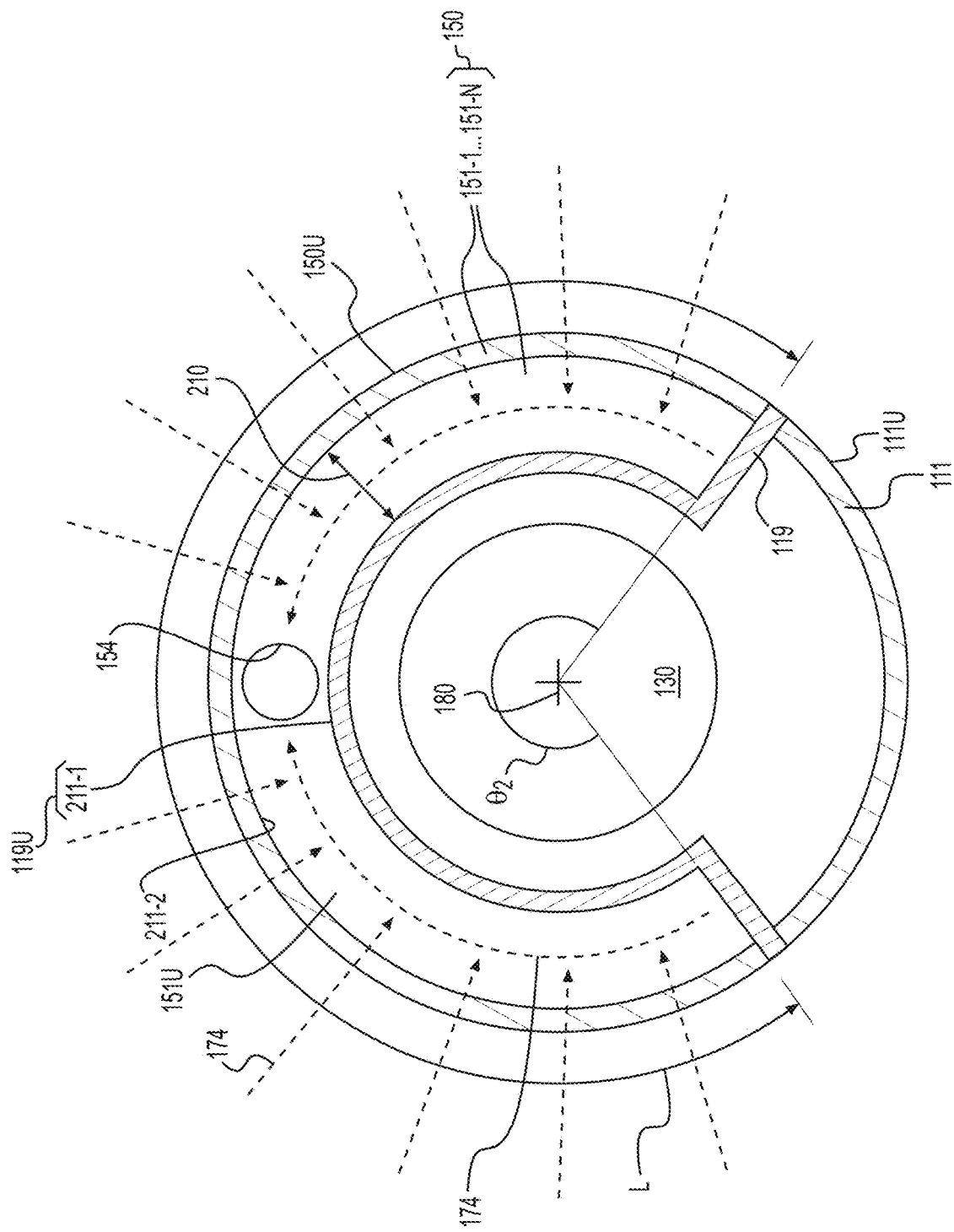
FIG. 1D is a cross-sectional view along line IC-IC' of the e-vaping device of FIG. 1A according to some example embodiments.

FIG. 1A is a perspective view of an e-vaping device 100 according to some example embodiments. FIG. 1B is a cross-sectional view along line IB-IB' of the e-vaping device 100 of FIG. 1A according to some example embodiments. FIG. 1C is a cross-sectional view along line IC-IC' of the e-vaping device 100 of FIG. 1A according to some example embodiments. FIG. 1D is a cross-sectional view along line IC-IC' of the e-vaping device 100 of FIG. 1A according to some example embodiments. As used herein, the term "e-vaping device" is inclusive of all types of electronic vaping devices, regardless of form, size or shape.

Referring to FIGS. 1A-1B, the e-vaping device 100 includes a vapor generator assembly 110 and a power supply assembly 120. In some example embodiments, the vapor generator assembly 110 and power supply assembly 120 include respective complementary connector assemblies 118, 128 and are configured to be detachably connected to each other based on detachably coupling the connector assemblies 118, 128 together. In some example embodiments, a vapor generator assembly 110 that is configured to be detachably coupled to a power supply assembly 120 to form an e-vaping device 100 may be referred to herein as a cartridge. In some example embodiments, the connector assemblies 118, 128 include threaded connectors. It should be appreciated that a connector assembly 118, 128 may be any type of connector, including, without limitation, a snug-fit, detent, clamp, bayonet, sliding fit, sleeve fit, alignment fit, threaded connector, magnetic, clasp, or any other type of connection, and/or combinations thereof.

As shown in FIGS. 1A-1B, the vapor generator assembly 110 includes an outer housing 111 and the power supply assembly 120 includes an outer housing 121. The outer housing 111 of the vapor generator assembly 110 may define an outer surface 111U of the vapor generator assembly 110, and the outer housing 121 of the power supply assembly 120 may define an outer surface 121U of the power supply assembly 120. Accordingly, the outer housings 111, 121 may collectively define an outer housing 191 of the e-vaping device 100, and the outer surfaces 111U, 121U may collectively define an outer surface 191U of the e-vaping device 100.

Still referring to FIGS. 1A-1B, the vapor generator assembly 110 includes a reservoir 112, a vaporizer assembly 130, and an air intake assembly 150. The vapor generator assembly 110 includes a reservoir housing 113 that at least partially defines an outer boundary of the reservoir 112, such that the reservoir 112 may include an internal space of the vapor generator assembly 110 that is at least partially defined by the reservoir housing 113 and one or more internal structural elements 114 of the vapor generator assembly 110. As further shown in FIG. 1B, the reservoir 112 may be further defined by at least the conduit 140 and vaporizer assembly 130, described further below. The reservoir 112 may hold a pre-vapor formulation 172. For example, where the reservoir 112 includes an enclosure defined by at least the reservoir housing 113, the reservoir 112 may hold pre-vapor formulation 172 in the enclosure.

The vaporizer assembly 130 may include an outer housing 131 that at least partially defines an interior space 135 of the vaporizer assembly 130. As further shown in at least FIG. 1B, the vaporizer assembly 130 may include a fluid port 134, which extends through the outer housing 131 of the vaporizer assembly 130 between the interior space 135 of the vaporizer assembly 130 and an exterior of the vaporizer assembly 130, such that the fluid port 134 may enable fluid communication between elements at least partially located within the interior space 135 and an exterior of the vaporizer assembly 130. As further shown in FIG. 1B, the fluid port 134 may enable fluid communication between the reservoir 112 and the vaporizer assembly 130.

The vaporizer assembly 130 may include a heater 136 and a dispensing interface 137. The dispensing interface 137 may be in fluid communication with the fluid port 134, such that the dispensing interface 137 is configured to be in fluid communication with the reservoir 112 through at least the fluid port 134. Accordingly, pre-vapor formulation drawn into the interior space 135 through fluid port 134 may be drawn by the dispensing interface 137 to be in fluid communication with the heater 136. The heater 136 may heat pre-vapor formulation 172 drawn from the reservoir 112 through the fluid port 134 to generate a vapor 176. Thus, the vaporizer assembly 130 may be configured to enable pre-vapor formulation 172 to be drawn from the reservoir 112 into at least a portion of the vaporizer assembly 130 and may be further configured to heat such drawn pre-vapor formulation 172 to form a vapor 176.

As further shown in FIG. 1B, the vaporizer assembly 130 may include one or more inlet ports 132 and an outlet port 142, where the inlet port(s) 132 and the outlet port 142 are in fluid communication with each other through a portion of the interior space 135 of the vaporizer assembly 130 that is further in fluid communication with at least the heater 136. The inlet port(s) 132 may direct air 174 into the vaporizer assembly 130 to flow in fluid communication with the heater 136 and at least a portion of the dispensing interface, such that the directed air 174 may entrain vapor 176 formed by the heater 136, and the air 174 and vapor 176 may be further drawn out of the vaporizer assembly 130 via outlet port 142.

As further shown in FIGS. 1A-1B, the outlet port 142 may be coupled to outlet port 144 via conduit 140, where the outlet port 144 extends through the outer housing 111 of the vapor generator assembly 110 such that the outlet port 144 is in direct fluid communication with the ambient environment that is external to the vapor generator assembly 110, and the conduit 140 establishes fluid communication between outlet port 142 and outlet port 144 such that outlet port 142 is in fluid communication with the ambient environment via conduit 140 and outlet port 144. Accordingly, the vapor generator assembly 110 is configured to direct vapor 176 and air 174 that are drawn out of the vaporizer assembly 130 via outlet port 142 to be further drawn out of the vapor generator assembly 110, and thus out of the e-vaping device 100, via conduit 140 and outlet port 144.

Still referring to FIGS. 1A-1B, the air intake assembly 150 is configured to direct air 174 into the vaporizer assembly 130 from the ambient environment that is external to the vapor generator assembly 110.

The air intake assembly 150 may include one or more structural elements (i.e., pieces of material, structures, or the like) 151-1 to 151-N (where N is a positive integer) which collectively at least partially define one or more spaces, conduits, channels, or the like, including an arcuate air inlet 152 and an inlet channel 154, such that the air intake assembly 150 may be understood to include the arcuate air inlet 152 and the inlet channel 154. As shown in at least FIGS. 1A-1B, at least an outer portion of the one or more structural elements 151-1 to 151-N of the air intake assembly 150 that is exposed to the exterior of the vapor generator assembly 110 may define an outer surface 150U of the air intake assembly 150. As shown in at least FIGS. 1B-1D, at least one structural element 151-1 to 151-N defines an outer surface 151U of the air intake assembly 150 that defines at least a portion of the arcuate air inlet 152, and the vapor generator assembly 110 may include a housing structure 119 that is separate from the air intake assembly 150 and has an outer surface 119U that defines a separate portion of the arcuate air inlet 152, such that at least the outer surface 151U of the air intake assembly 150 and the outer surface 119U of the housing structure 119 collectively define the arcuate air inlet 152. In some example embodiments, the housing structure 119 is a portion of the reservoir housing 113, such that reservoir housing 113 and housing structure 119 are included in a unitary piece of material.

As further shown in FIGS. 1A-1B, the air intake assembly 150, housing structure 119, and reservoir housing 113 may collectively define the outer housing 111 of the vapor generator assembly 110, and the outer surfaces 150U, 151U, 119U, 113U of the air intake assembly 150, housing structure 119, and reservoir housing 113 may collectively define the outer surface 111U of the vapor generator assembly 110. As shown in FIGS. 1A-1D, the arcuate air inlet 152 extends at least partially around the outer surface 150U of the air intake assembly 150 and the outer surface 119U of the housing structure 119, thereby extending at least partially around the outer surface 111U of the vapor generator assembly 110, at least partially around the outer surface 191U of the e-vaping device 100, or a combination thereof.

As shown in at least FIGS. 1B-1D, at least one structural element 151-1 to 151-N defines an outer surface 151U of the air intake assembly 150 that defines at least a portion of the arcuate air inlet 152, and the inlet channel 154 extends from the outer surface 151U to extend from the arcuate air inlet 152 into an interior of the vapor generator assembly 110 that is at least partially defined by the outer housing 111, an interior of the e-vaping device 100 that is at least partially defined by the outer housing 191, or a combination thereof, to at least partially establish fluid communication between the arcuate air inlet 152 and the vaporizer assembly 130. As shown in at least FIG. 1B, the inlet channel 154 may extend coaxially in relation to a longitudinal axis 180. The longitudinal axis 180 may be the longitudinal axis of the vapor generator assembly 110, the power supply assembly 120, the e-vaping device 100, a sub-combination thereof, or a combination thereof.

Still referring to FIGS. 1A-1B, the vapor generator assembly 110 may include an airflow conduit 164 extending through the housing structure 119 between the inlet channel 154 of the air intake assembly 150 and the inlet port(s) 132 of the vaporizer assembly 130. Accordingly, the inlet channel 154 may be configured to establish fluid communication between the arcuate air inlet 152 and the vaporizer assembly 130 via the airflow conduit 164. As shown in FIG. 1B, the airflow conduit 164 may extend at least partially radially in relation to the longitudinal axis 180, thereby extending orthogonal in relation to the inlet channel 154. As shown in FIG. 1B, the airflow conduit 164 may extend through a portion of the housing structure 119, but example embodiments are not limited thereto. In some example embodiments, airflow conduit 164 is omitted from the vapor generator assembly 110, such that the inlet channel 154 is in direct fluid communication (e.g., without any interposing conduits) with the inlet port(s) 132.

Still referring to FIGS. 1A-1B, the power supply assembly 120 may include a power supply 122. The power supply 122 may be a rechargeable battery, and the power supply assembly 120 may be configured to supply electrical power from the power supply 122 to the heater 136 via one or more electrical leads to support vapor generation at the vaporizer assembly 130.

As shown in FIG. 1B, the e-vaping device 100 may include an instance of control circuitry 124 that may be configured to control the supply of electrical power from the power supply 122 to the vaporizer assembly 130. In the example embodiments shown in FIG. 1B, the control circuitry 124 is included in the power supply assembly 120, but it will be understood that, in some example embodiments, the control circuitry 124 may be included in the vapor generator assembly 110 instead of the power supply assembly 120.

In some example embodiments, wherein the vapor generator assembly 110 and the power supply assembly 120 are configured to be detachably coupled via complementary connector assemblies 118 and 128, respectively, one or more electrical circuits through the vapor generator assembly 110 and the power supply assembly 120 may be established based on connector assemblies 118, 128 being coupled together. The established electrical circuits may include at least the heater 136, the control circuitry 124, and the power supply 122. The electrical circuit may include electrical leads one or both of connector assemblies 118, 128.

The power supply 122 may be a Lithium-ion battery or one of its variants, for example a Lithium-ion polymer battery. Further, the power supply 122 may be rechargeable and may include circuitry configured to allow the battery to be chargeable by an external charging device.

Upon completing the connection between the vapor generator assembly 110 and the power supply assembly 120, the power supply 122 may be electrically connected with the heater 136 by control circuitry 124 based on a signal received at the control circuitry 124 from a sensor of the e-vaping device 100, an interface of the e-vaping device 100, or a combination thereof. To control the supply of electrical power to a heater 136, the control circuitry 124 may execute one or more instances of computer-executable program code. The control circuitry 124 may include a processor and a memory. The memory may be a computer-readable storage medium storing computer-executable code.

The control circuitry 124 may be a special purpose machine configured to execute the computer-executable code to control the supply of electrical power to the heater 136. Controlling the supply of electrical power to the heater 136 may be referred to herein interchangeably as activating the heater 136.

Referring now to FIGS. 1A-1D, in some example embodiments, the air intake assembly 150 is configured to at least enable fluid communication between the ambient environment and the vaporizer assembly 130 wherein the arcuate air inlet 152 is at least partially resistant to obstruction, for example by a hand of an adult vaper as a result of the e-vaping device 100 being manually manipulated by an adult vaper. As shown in FIGS. 1A and 1C-1D and as described further below, the arcuate air inlet 152 may extend around a substantial fraction of the circumference of the outer surface 111U of the vapor generator assembly 110, such that at least a portion of the arcuate air inlet 152 may be exposed to the ambient environment and enable fluid communication between the inlet channel 154 and the ambient environment, even when an adult vaper's hand at least partially covers a portion of the outer surface 111U. In view of the air intake assembly 150 being configured to direct air 174 to the vaporizer assembly 130 with at least partial resistance to obstruction, the air intake assembly 150 may be configured to enable improved reliability and flow rate of the supply of air 174 to the vaporizer assembly 130 during operation of the e-vaping device 100, thereby improving performance of the e-vaping device 100 and improving the sensor experience provided by the e-vaping device 100.

Referring to FIGS. 1C-1D, the arcuate air inlet 152 is at least partially defined by an arcuate gap 210 between at least two separate inner surfaces 211-1, 211-2 that extend along an arc around the longitudinal axis 180, where the arcuate gap 210 is further defined in a direction extending parallel to longitudinal axis 180 by the outer surface 151U of the air intake assembly 150. In FIGS. 1A-1D, one inner surface 211-1 is a radially outward-facing outer surface 119U, facing radially outward from the longitudinal axis 180 of the housing structure 119. Another inner surface 211-2 is a radially inward-facing surface of the one or more structural elements 151-1 to 151-N of the air intake assembly 150, such that the arcuate air inlet 152 is at least partially defined by an arcuate gap 210 between the air intake assembly 150 and housing structure 119 of the vapor generator assembly 110. In some example embodiments, for example where housing structure 119 is omitted from the vapor generator assembly 110, the separate inner surfaces 211-1, 211-2 are separate surfaces of one or more structural elements 151-1 to 151-N of the air intake assembly 150. In some example embodiments, the separate inner surfaces 211-1, 211-2 are separate surfaces of a single, unitary piece of material that is included in one or more structural elements 151-1 to 151-N of the air intake assembly 150.

In some example embodiments, where the arcuate air inlet 152 is an annular air inlet that extends around an entirety of the circumference of the outer surface 111U, the arcuate gap 210 is an annular gap that also extends along a 360-degree arc around the longitudinal axis 180.

Still referring to FIGS. 1C-1D, the air intake assembly 150 may include and/or at least partially define an arcuate air inlet 152 that extends along an arc that subtends an angle centered at the longitudinal axis 180. As shown in FIG. 1C, the arcuate air inlet 152 may extend along an arc that subtends an angle $\theta_1$, centered at the longitudinal axis 180, that is equal to or less than 180 degrees, such that the arcuate air inlet 152 has a length L that extends along a distance that is equal to or less than one-half of the circumference of the outer surface 111U of the vapor generator assembly 110. As shown in FIG. 1D, the arcuate air inlet 152 may extend along an arc that subtends an angle $\theta_2$, centered at the longitudinal axis 180, that is greater than 180 degrees, such that the arcuate air inlet 152 has a length L that extends along greater than one-half of the circumference of the outer surface 111U of the vapor generator assembly 110. In some example embodiments, the arcuate air inlet 152 may be a semi-annular air inlet, or the like. As shown in FIGS. 1C-1D, air 174 may be drawn into the arcuate gap 210 of the arcuate air inlet 152 from various points around the portion of the circumference of the outer surface 111U of the vapor generator assembly 110 through which the arcuate air inlet 152 extends, and such air 174 may further be drawn through the arcuate gap 210 to the inlet channel 154 to be directed to the vaporizer assembly 130. Accordingly, the air intake assembly 150 that includes the arcuate air inlet 152 and the inlet channel 154 may have improved resistance to obstruction, as air 174 may be drawn into the inlet channel 154, and thus directed to the vaporizer assembly 130, from various locations around the circumference of the outer surface 111U.

As shown in FIG. 1A by the dashed-line extension 152X of arcuate air inlet 152, the arcuate air inlet 152 may extend around an entirety of the outer surface 111U of the vapor generator assembly 110, such that the arcuate air inlet 152 may be an annular air inlet.

In some example embodiments, connector assemblies 118, 128 are omitted from the e-vaping device 100, such that the vapor generator assembly 110 and the power supply assembly 120 are fixedly coupled together and are precluded from being detachably coupled with each other. As shown in FIGS. 1A and 1B, in some example embodiments, the outer housing 111 of the vapor generator assembly 110 and the outer housing 121 of the power supply assembly 120 may include a unitary piece of material.

In some example embodiments, the air intake assembly 150 is included in the power supply assembly 120, such that the outer surface 150U of the air intake assembly 150 at least partially defines the outer surface 121U of the power supply assembly 120, and the arcuate air inlet 152 may be at least partially defined by a housing of the power supply assembly 120. In some example embodiments, the airflow conduit 164 extends at least partially through one or more structures of the power supply assembly 120.

The pre-vapor formulation is a material or combination of materials that may be transformed into a vapor. The reservoir 112, in some example embodiments, may include a storage medium that may hold the pre-vapor formulation. The dispensing interface 137 may include a wick, also referred to herein as an instance of wicking material. The dispensing interface 137 may include filaments (or threads) having a capacity to draw the pre-vapor formulation. In some example embodiments, the heater 136 may include a wire coil. The wire coil may at least partially surround the dispensing interface 137 in the interior space 135 of the vaporizer assembly 130. The wire may be a metal wire and/or the wire coil may extend fully or partially along the length of the dispensing interface 137. The heater 136 may be formed of any suitable electrically resistive materials.

In some example embodiments, one or more portions of the vapor generator assembly 110 may be replaceable. Such one or more portions may include the vaporizer assembly 130, the reservoir 112, the reservoir assembly 102, a sub-combination thereof, or a combination thereof. In some example embodiments, the entire e-vaping device 100 may be disposed once the reservoir 112, the vaporizer assembly 130, or a combination thereof is depleted.

Figure 2A:
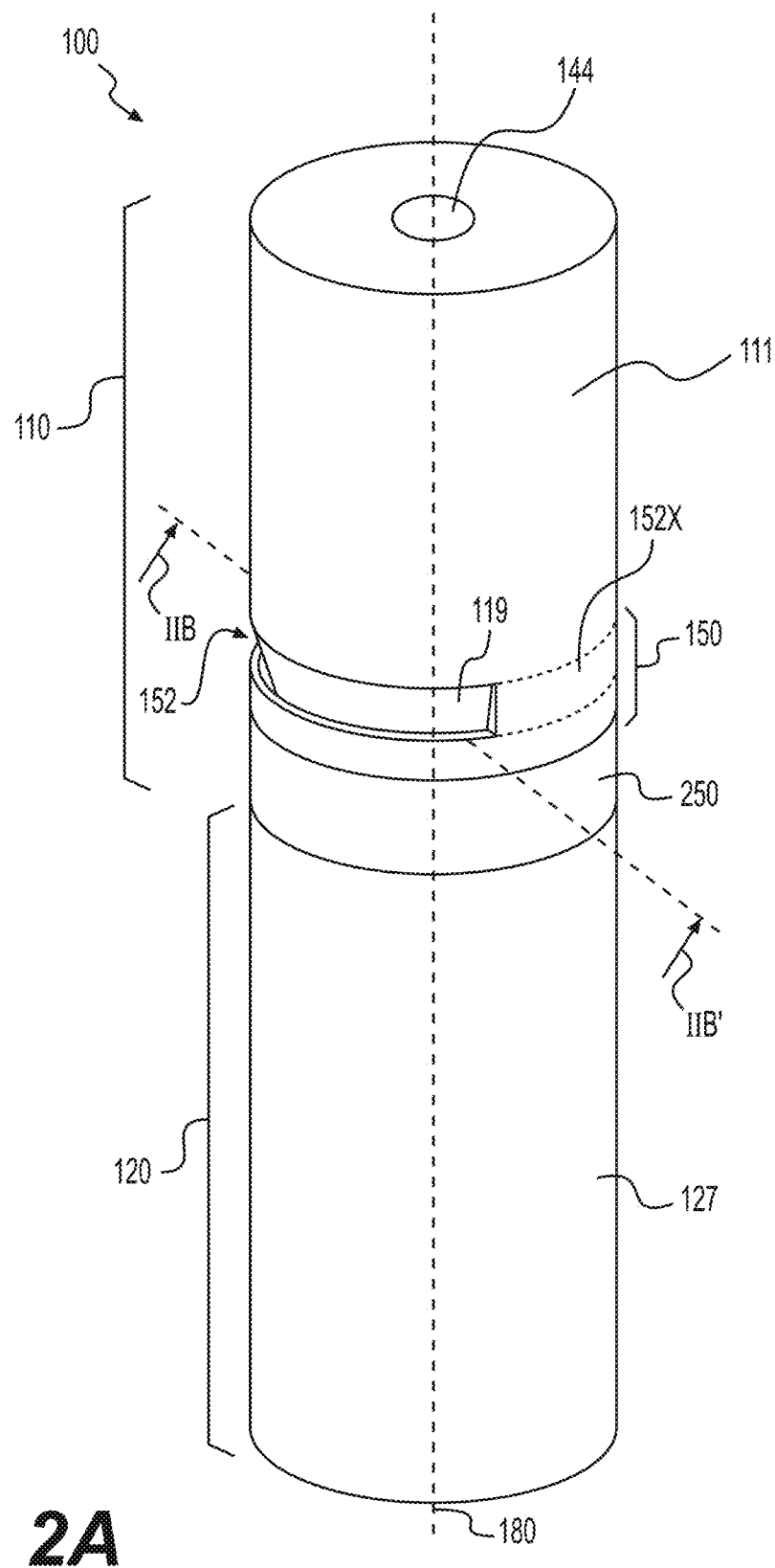
FIG. 2A is a perspective view of an e-vaping device according to some example embodiments.
Figure 2B:
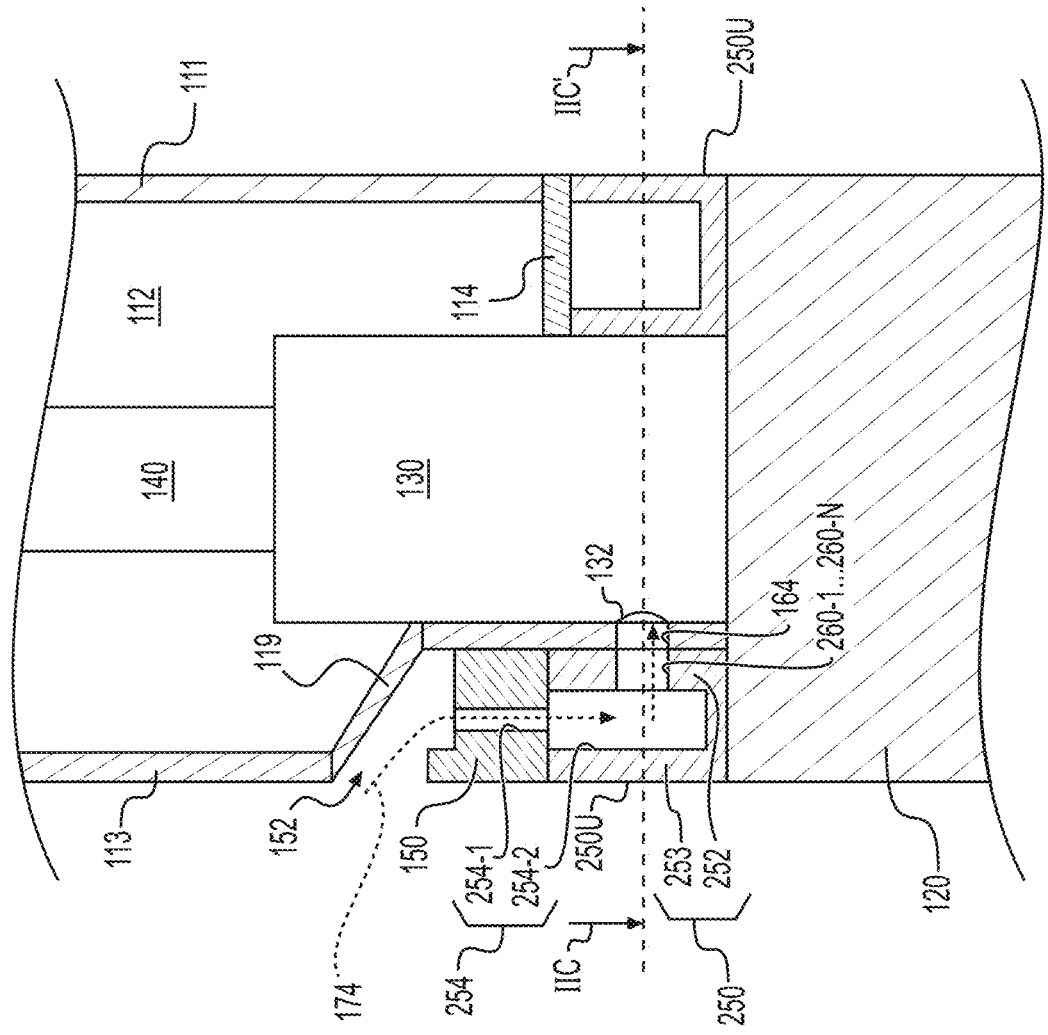
FIG. 2B is a cross-sectional view along line IIB-IIB' of a portion of the e-vaping device of FIG. 2A according to some example embodiments.
Figure 2C:
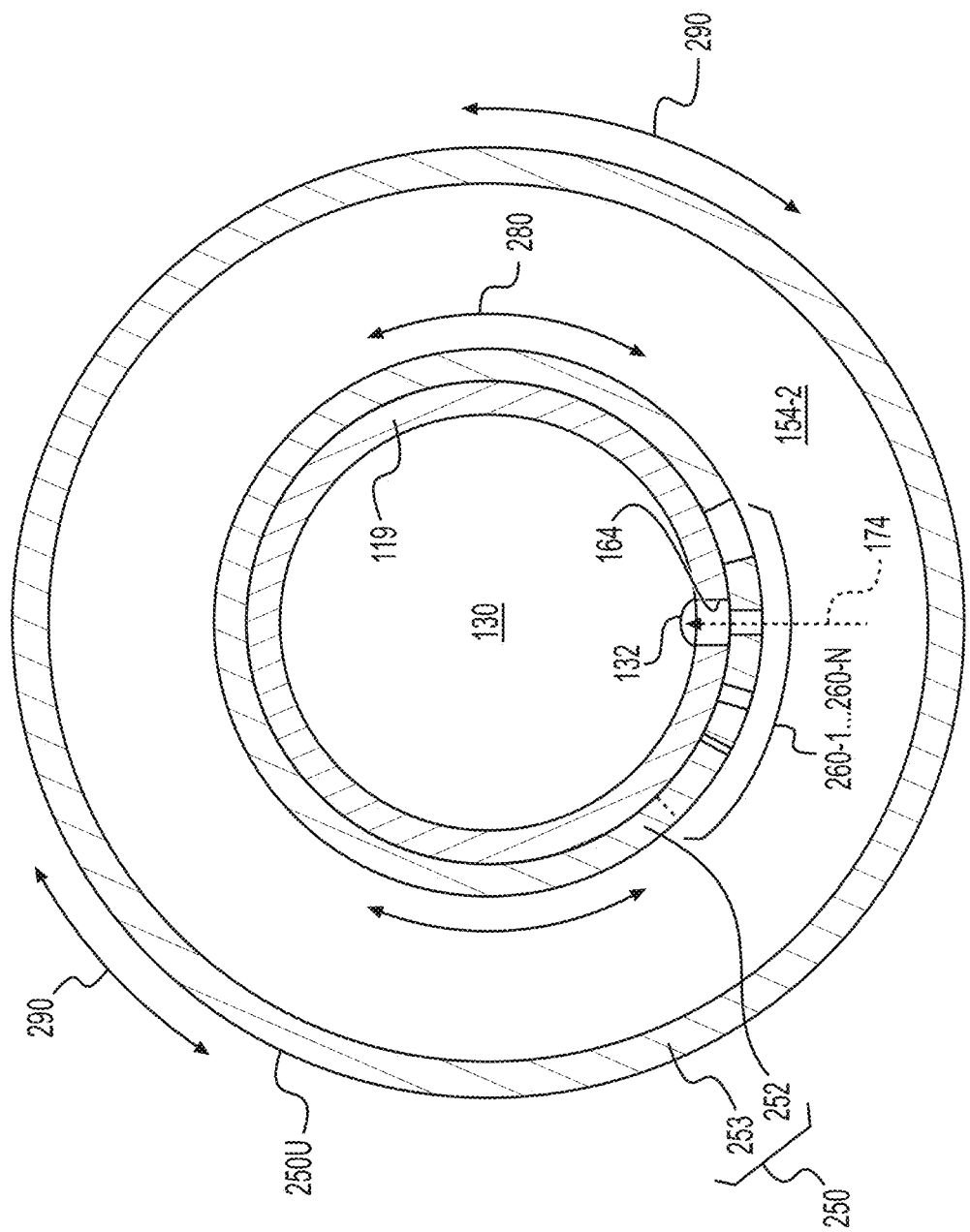
FIG. 2C is a cross-sectional view along line IIC-IIC' of the e-vaping device of FIG. 2B according to some example embodiments.

FIG. 2A is a perspective view of an e-vaping device according to some example embodiments. FIG. 2B is a cross-sectional view along line IIB-IIB' of a portion of the e-vaping device of FIG. 2A according to some example embodiments. FIG. 2C is a cross-sectional view along line IIC-IIC' of the e-vaping device of FIG. 2B according to some example embodiments.

Referring to FIGS. 2A-2C, the vapor generator assembly 110 may include a flow control structure 250 that is configured to adjustably control a cross-sectional flow area associated with the airflow conduit 164, in order to adjustably control the amount and/or flow rate of air 174 drawn into the vaporizer assembly 130 via the air intake assembly 150 during operation of the e-vaping device 100, thereby providing improved control over performance of the e-vaping device 100 and the sensor experience provided thereby.

As shown in FIGS. 2A-2C, the flow control structure 250 may include an inner structure 252 and an outer structure 253. The inner and outer structures 252, 253 may be separate, coupled structural elements or may be included in a unitary piece of material. Inner structure 252 extends around the longitudinal axis 180 and includes a set of one or more orifices 260-1 to 260-N (where N is a positive integer) extending therethrough, and at least the inner structure 252 is configured to rotate 280 around longitudinal axis 180 to adjustably align one of the orifices 260-1 to 260-N with the airflow conduit 164. Each orifice 260-1 to 260-N may have a different size, and the size of one or more orifices 260-1 to 260-N may be different from the size of the airflow conduit 164, such that a given orifice 260-1 to 260-N, when aligned with the airflow conduit 164, may control the cross-sectional flow area associated with the airflow conduit 164, relative to the cross-sectional flow area of the airflow conduit 164 independently of the one or more orifices 260-1 to 260-N, thereby controlling the maximum flowrate of air 174 into the vaporizer assembly 130 from the air intake assembly 150 via the airflow conduit 164. Based on being configured to adjustably align different orifices 260-1 to 260-N with the airflow conduit 164, the flow control structure 250 may enable adjustable control over the flowrate and/or amount of air 174 into the vaporizer assembly 130 during operation of the e-vaping device 100. In some example embodiments, based on being configured to adjustably align different orifices 260-1 to 260-N with the airflow conduit 164, the flow control structure 250 may enable adjustable control over the resistance to draw ("RTD") of the e-vaping device 100 flowrate and/or amount with regard to air 174 drawn through the e-vaping device 100, thereby enabling adult vaper-initiated control and/or customization of the performance of the e-vaping device 100 to thereby customize and/or improve the sensory experience provided by the e-vaping device 100 with regard one or more various adult vapers.

As described herein, it will be understood that, in some example embodiments, a flow control structure, including the flow control structure 250 as shown in FIGS. 2A-2C, is configured to adjust at least the inner structure 252 to completely cover the airflow conduit 164 from the inlet channel.

Still referring to FIGS. 2A-2C, outer structure 253 extends around the longitudinal axis 180 and is configured to be exposed to the exterior of the vapor generator assembly 110, such that at least the outer structure 253 of the flow control structure 250 defines an outer surface 250U of the flow control structure 250. The outer surface 250U may at least partially define the outer surface 111U of the vapor generator assembly 110, the outer surface 191U of the e-vaping device 100, the outer surface 121U of the power supply assembly 120, a sub-combination thereof, or a combination thereof.

As shown in FIG. 2C, the inner structure 252 of the flow control structure 250 may be an adjustment ring structure that is configured to be rotated 280 around the longitudinal axis 180 to adjustably align a selected orifice 260-1 to 260-N with the airflow conduit 164, and the outer structure 253, which is coupled to the inner structure 252, may be configured to be rotated 290 around longitudinal axis 180 from an exterior of the e-vaping device 100, e.g., by an adult vaper, so as to cause at least the coupled inner structure 252 to rotate 280 around the longitudinal axis 180, thereby adjustably moving the orifices 260-1 to 260-N in relation to the airflow conduit 164 to adjustably align one of the orifices 260-1 to 260-N with the airflow conduit 164. The e-vaping device 100 may include one or more external markings indicating which orifice 260-1 to 260-N is aligned with the airflow conduit 164 based on the rotated position of the flow control structure 250.

Still referring to FIGS. 2A-2C, the air intake assembly 150 and the flow control structure 250 may each define a separate portion of an inlet channel 254 extending from the arcuate air inlet 152 into an interior of the vapor generator assembly 110 to at least partially establish fluid communication between the arcuate air inlet 152 and the vaporizer assembly 130. As shown in FIGS. 2B-2C, for example, the air intake assembly 150 may define a first inlet channel 254-1 extending through one or more structural elements 151-1 to 151-N of the air intake assembly 150, and the flow control structure 250 may at least partially define an annular second inlet channel 254-2 that establishes fluid communication between the first inlet channel 254-1 and the airflow conduit 164 via an aligned orifice 260-1 to 260-N, where the first and second inlet channels 254-1, 254-2 collectively define inlet channel 254.

While the above description of the flow control structure 250 is directed to example embodiments of the flow control structure that are included in the vapor generator assembly 110 with the air intake assembly 150, it will be understood that in some example embodiments, the flow control structure 250 may be included in the power supply assembly 120, separately or together with the air intake assembly 150.

Figure 3A:
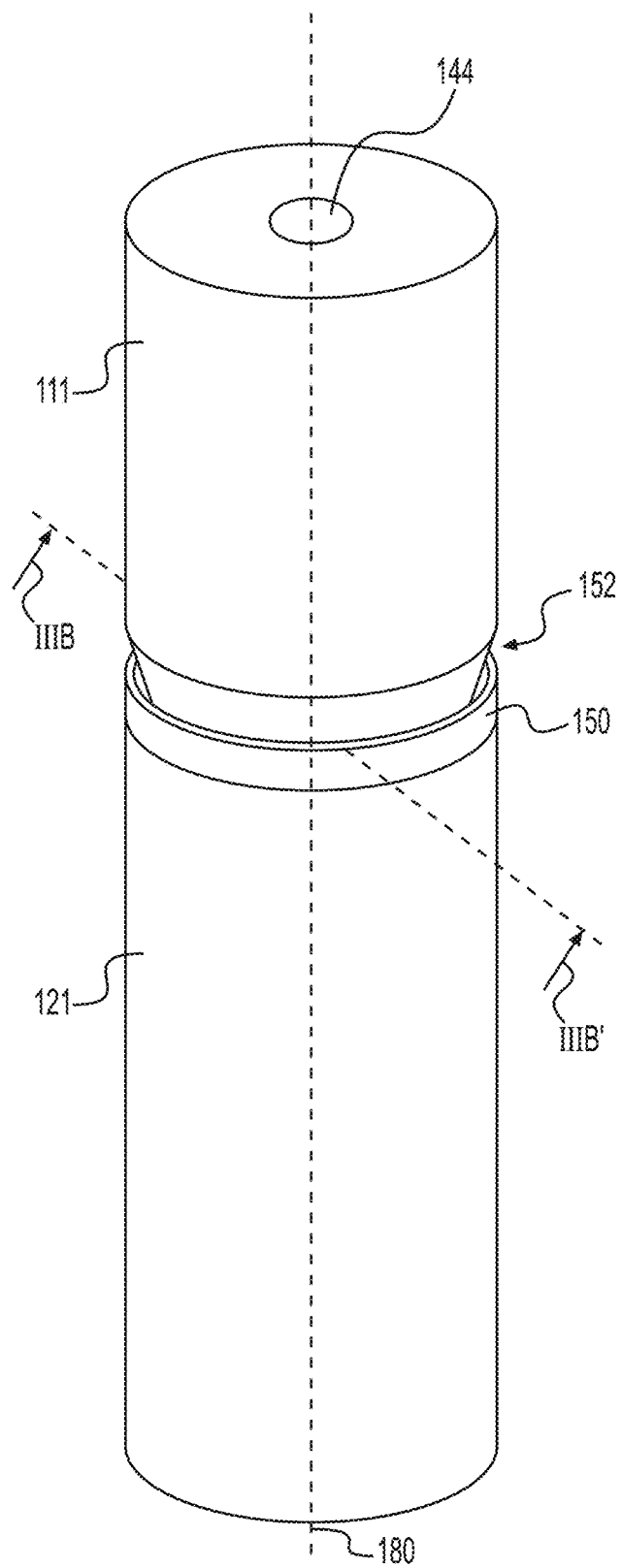
FIG. 3A is a perspective view of an e-vaping device according to some example embodiments.
Figure 3B:
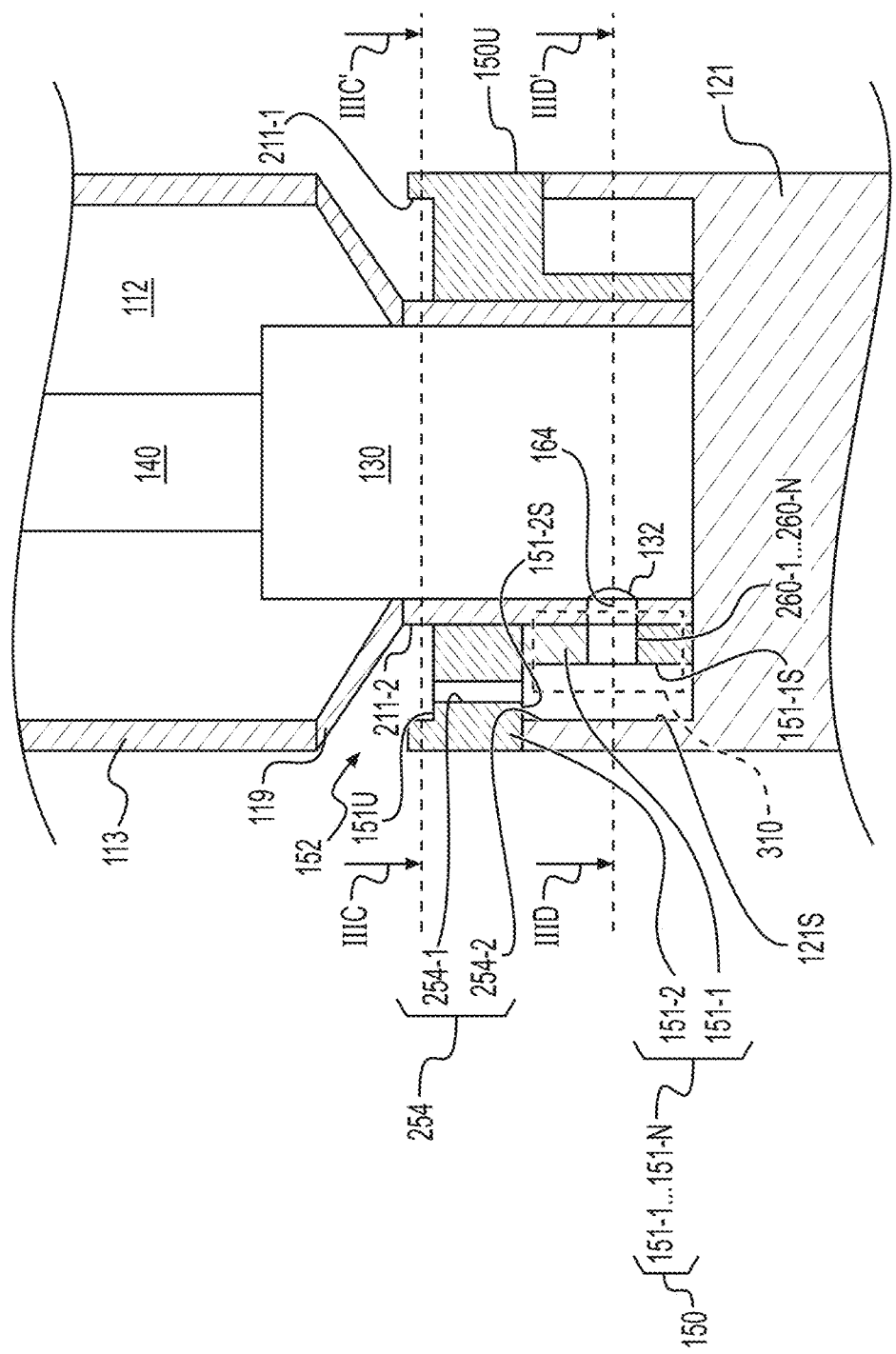
FIG. 3B is a cross-sectional view along line IIIB-IIIB' of a portion of the e-vaping device of FIG. 3A according to some example embodiments.
Figure 3C:
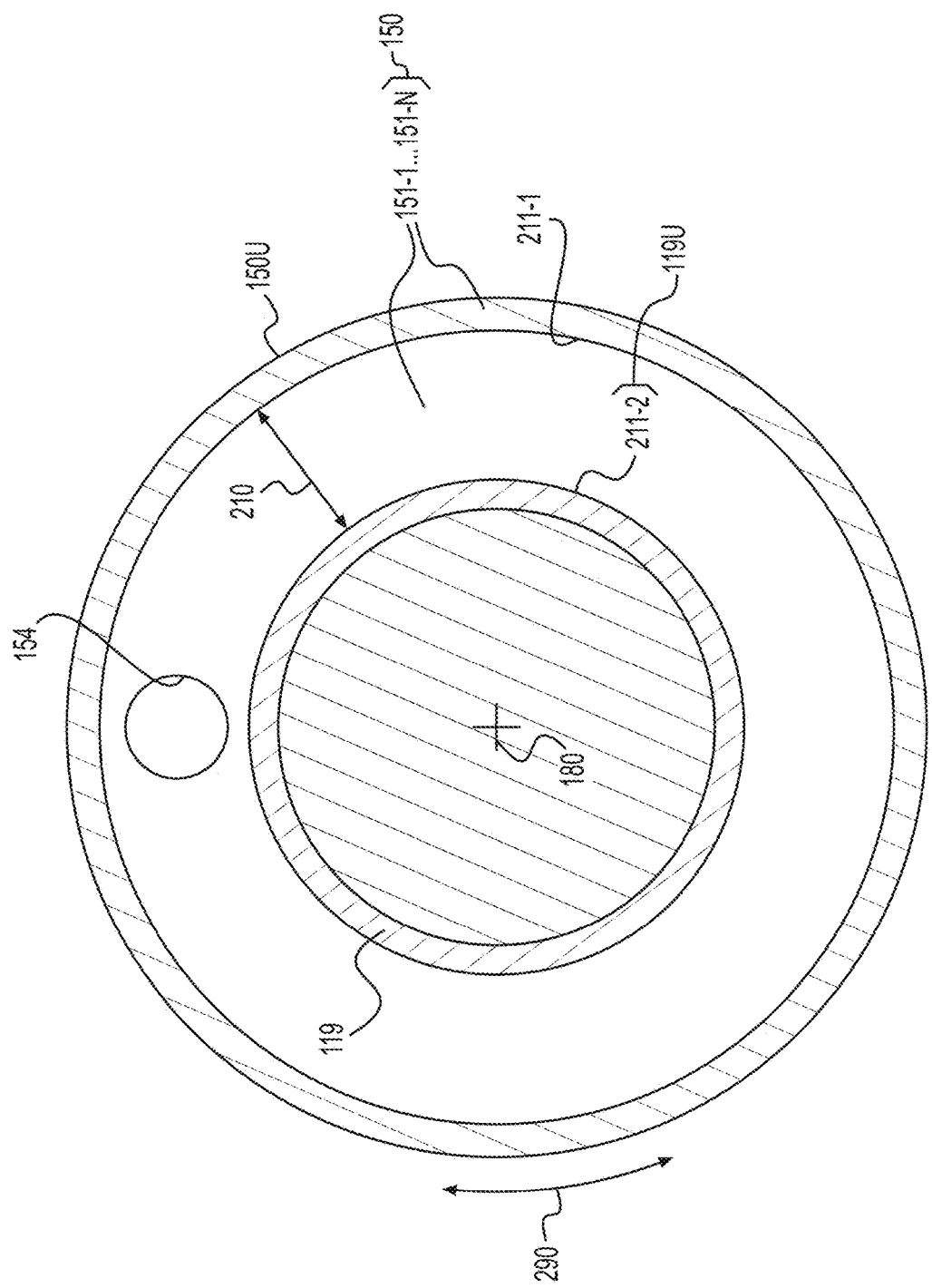
FIG. 3C is a cross-sectional view along line IIIC-IIIC' of the e-vaping device of FIG. 3B according to some example embodiments.
Figure 3D:
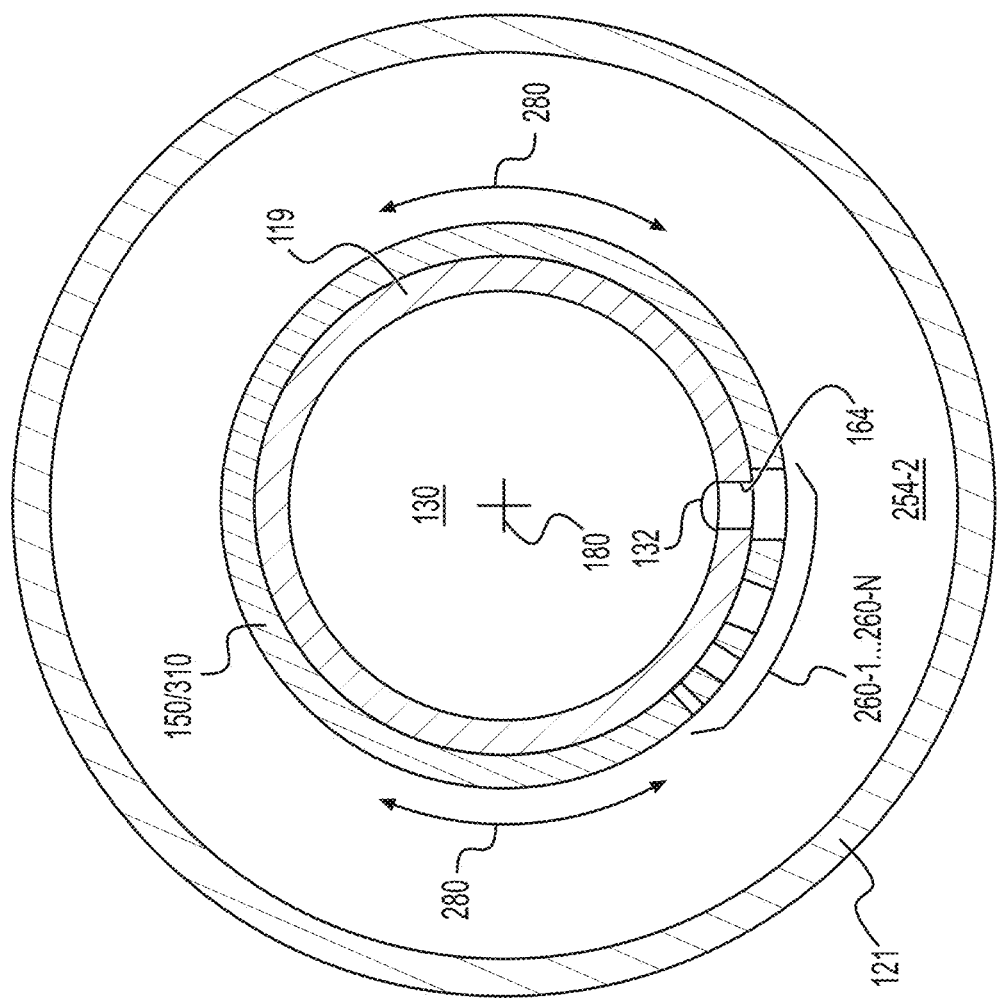
FIG. 3D is a cross-sectional view along line IIID-IIID' of the e-vaping device of FIG. 3B according to some example embodiments.

FIG. 3A is a perspective view of an e-vaping device according to some example embodiments. FIG. 3B is a cross-sectional view along line IIIB-IIIB' of a portion of the e-vaping device of FIG. 3A according to some example embodiments. FIG. 3C is a cross-sectional view along line IIIC-IIIC' of the e-vaping device of FIG. 3B according to some example embodiments. FIG. 3D is a cross-sectional view along line IIID-IIID' of the e-vaping device of FIG. 3B according to some example embodiments.

As shown in FIGS. 3A-3D, in some example embodiments, the air intake assembly 150 may include an arcuate air inlet 152 that is an annular air inlet that extends around an entirety of the outer surface 111U of the vapor generator assembly 110.

In addition, as shown in FIGS. 3B-3D, in some example embodiments, a flow control structure 310, including a plurality of orifices 260-1 to 260-N having different sizes and configured to adjustably align a selected orifice 260-1 to 260-N with the airflow conduit 164 to adjustably control a cross-sectional flow area associated with the airflow conduit 164, may be included within the air intake assembly 150, such that the air intake assembly 150 includes one or more structural elements 151-1 to 151-N that define the flow control structure 310. As shown in FIGS. 3B and 3D, for example, the air intake assembly 150 may include a first structural element 151-1 that defines the "adjustment ring" inner structure of the flow control structure 310, similarly to the inner structure 252 as shown in FIG. 2C, through which one or more orifices 260-1 to 260-N extend and which is configured to rotate 280 around longitudinal axis 180 to adjustably align one of the orifices 260-1 to 260-N with the airflow conduit 164. Additionally, the air intake assembly 150 may include a second structural element 151-2 that is configured to be exposed to the exterior of the vapor generator assembly 110 and to at least partially define the outer surface 150U of the air intake assembly 150, where the second structural element 151-2 is coupled to the first structural element 151-1 and, similarly to the outer structure 254 as shown in FIG. 2D, is configured to be physically manipulated from the exterior of the e-vaping device to rotate 290 around the longitudinal axis 180 to thus cause the flow control structure 310 to be rotated 280 to adjustably align an orifice 260-1 to 260-N with the airflow conduit 164. Accordingly, the flow control structure 310 may be provided in the e-vaping device 100 without requiring a separate element from the air intake assembly 150, thereby reducing the quantity of separate parts included in the e-vaping device 100 and therefore improving fabrication efficiency and reducing complexity of the e-vaping device 100.

Still referring to FIGS. 3A-3D, and as particularly shown in FIGS. 3B and 3D, in some example embodiments, the air intake assembly 150 may define a portion of the inlet channel 254 and the outer housing 121 of the power supply assembly 120 may define a portion of the inlet channel 254. For example, as shown in FIGS. 3C and 3D, the second structural element 151-2 of the air intake assembly 150 may define a first inlet channel 254-1 extending through the second structural element 151-2 from the outer surface 151U, and surfaces 151-1S, 151-2S of the first and second structural elements 151-1 and 151-2 may partially define the annular second inlet channel 254-2 extending between the first inlet channel 254-1 and the airflow conduit 164 and orifices 260-1 to 260-N. As further shown, at least an inner surface 121S of the outer housing 121 of the power supply assembly 120 may define an outer boundary of the second inlet channel 254-2, such that the inlet channel 254 is collectively defined by at least the air intake assembly 150 and the outer housing 121 of the power supply assembly 120.

In the example embodiments shown in FIGS. 3A-3D, the arcuate air inlet 152 is at least partially defined by one or more one or more structural elements 151-1 to 151-N of the air intake assembly 150 and at least a portion of the outer housing 119 of the of the vapor generator assembly 110. In some example embodiments, the arcuate air inlet 152 is at least partially defined by one or more one or more structural elements 151-1 to 151-N of the air intake assembly 150 and at least a portion of the outer housing 121 of the power supply assembly 120. For example, the outer housing 121 may include the beveled portion of the outer housing 119, and the outer surface 151U of the air intake assembly 150, which may be a lower surface of the structural element 151-2, may face towards the outer housing 119 of the outer housing 121. Accordingly, the outer surface 151U and the beveled portion of the housing structure 119 of the outer housing 121 of the power supply assembly 120 may collectively define the arcuate air inlet 152.

In the example embodiments shown in FIGS. 3A-3D, the air intake assembly 150 includes a single set of orifices 260-1 to 260-N, and the vapor generator assembly 110 includes a single airflow conduit 164 and a single inlet port 132 to the vaporizer assembly 130. But, example embodiments are not limited thereto. For example, as shown in FIG. 4C, in some example embodiments, the vaporizer assembly 130 may include two inlet ports 132 on opposite sides of the vaporizer assembly 130, the vapor generator assembly 110 may include two airflow conduits aligned with separate inlet ports 132, and the air intake assembly 150 may include two separate sets of orifices 260-1 to 260-N that are configured to be adjustably aligned with separate airflow conduits 164 on opposite sides of the vaporizer assembly 130 based on rotation 280 of the inner structure 252. In some example embodiments, the air intake assembly 150 may include two separate first inlet channels 254-1 on opposite sides of the second structural element 151-2, such that the air intake assembly 150 may draw air into opposite sides of the annular second inlet channel 254-2 via the separate first inlet channels 254-2.

It will be understood that, in some example embodiments, the outer structure 253 may be configured to be rotated 290 in a clockwise direction and/or a counter-clockwise direction around longitudinal axis 180, so as to cause at least the coupled inner structure 252 to rotate 280 in a clockwise direction and/or a counter-clockwise direction around longitudinal axis 180.

Figure 4A:
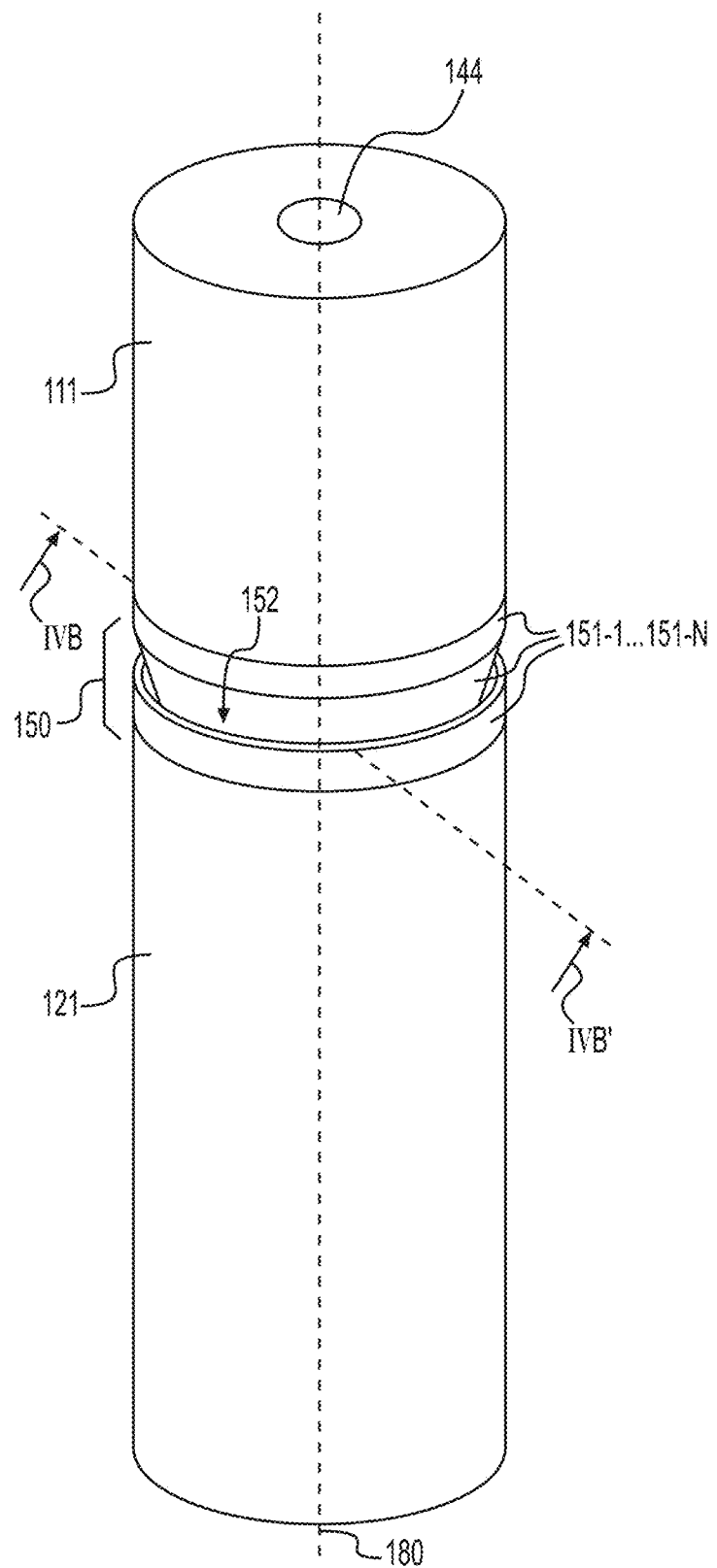
FIG. 4A is a perspective view of an e-vaping device according to some example embodiments.
Figure 4B:
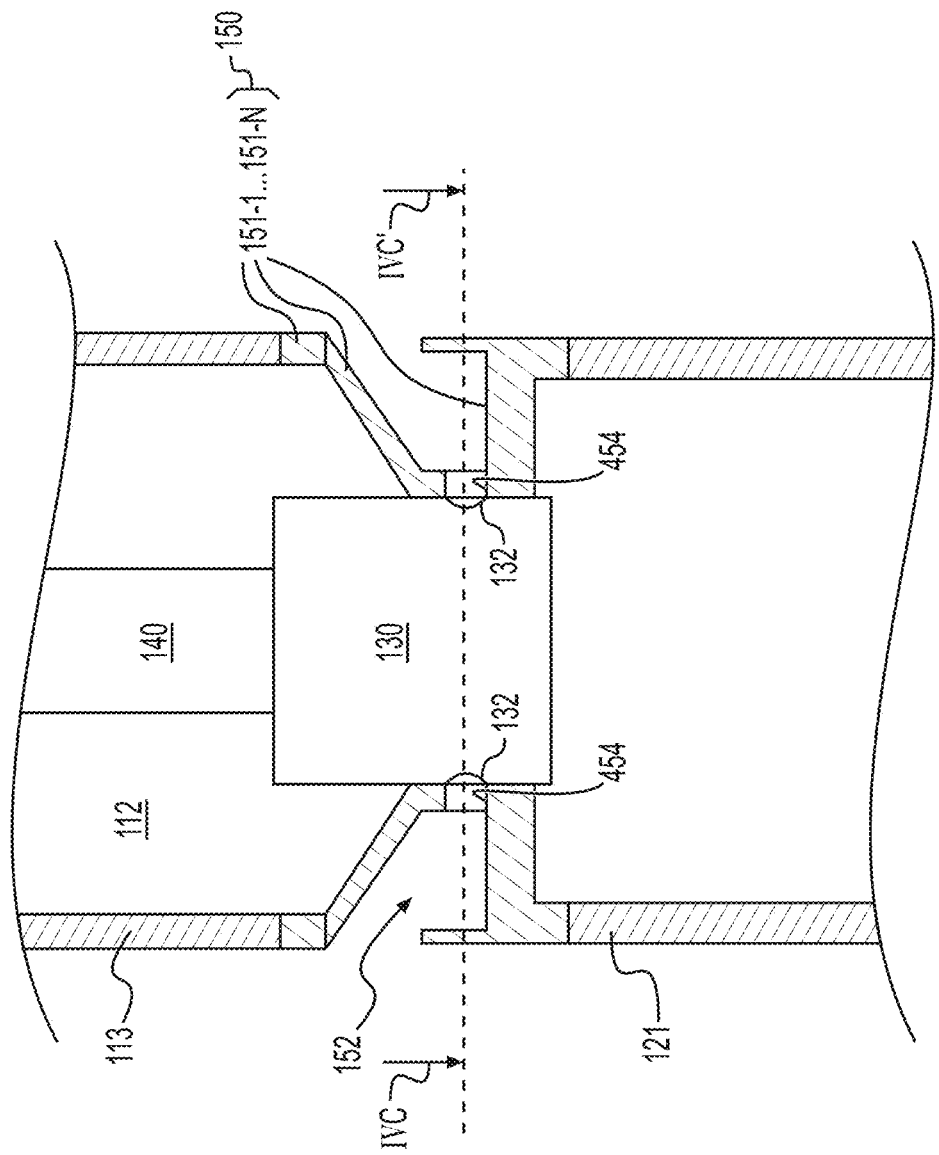
FIG. 4B is a cross-sectional view along line IVB-IVB' of a portion of the e-vaping device of FIG. 4A according to some example embodiments.
Figure 4C:
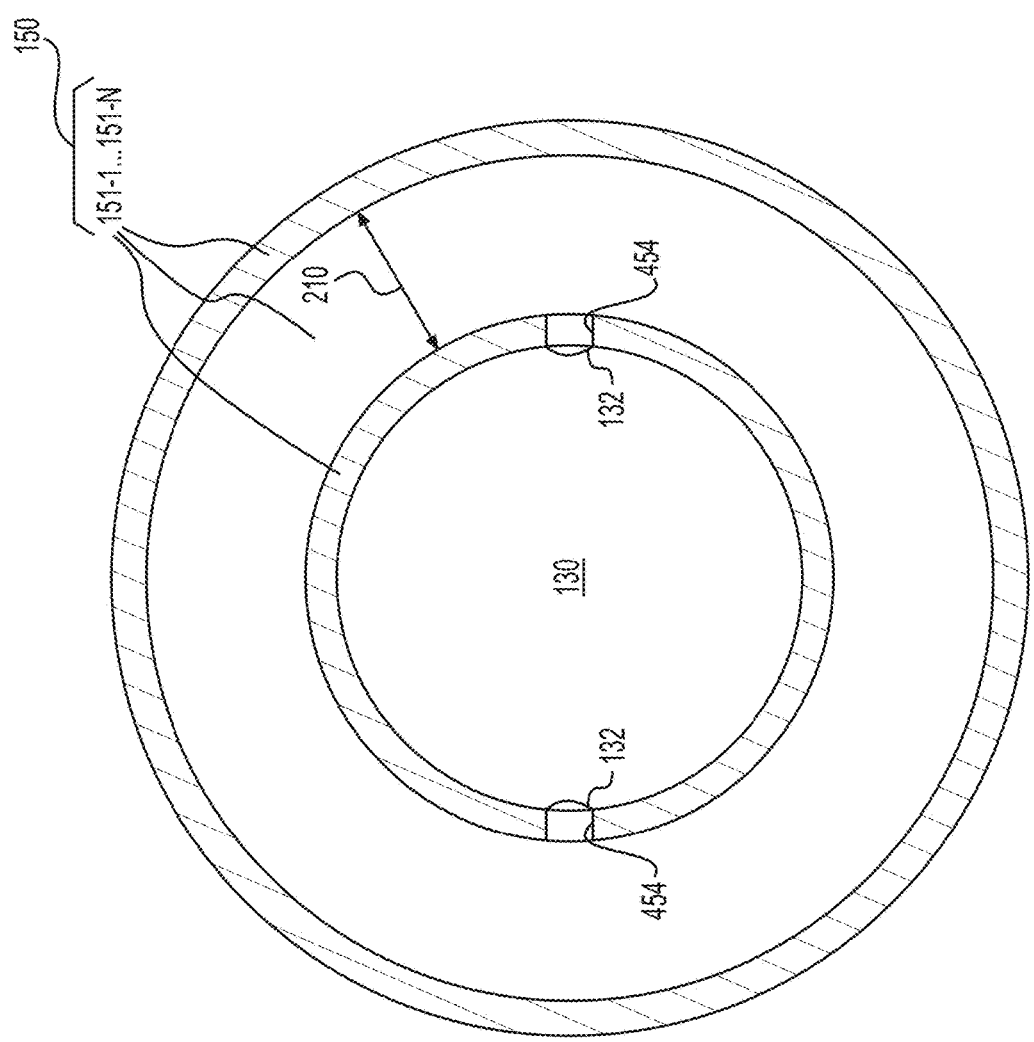
FIG. 4C is a cross-sectional view along line IVC-IVC' of the e-vaping device of FIG. 4B according to some example embodiments.
Figure 4D:
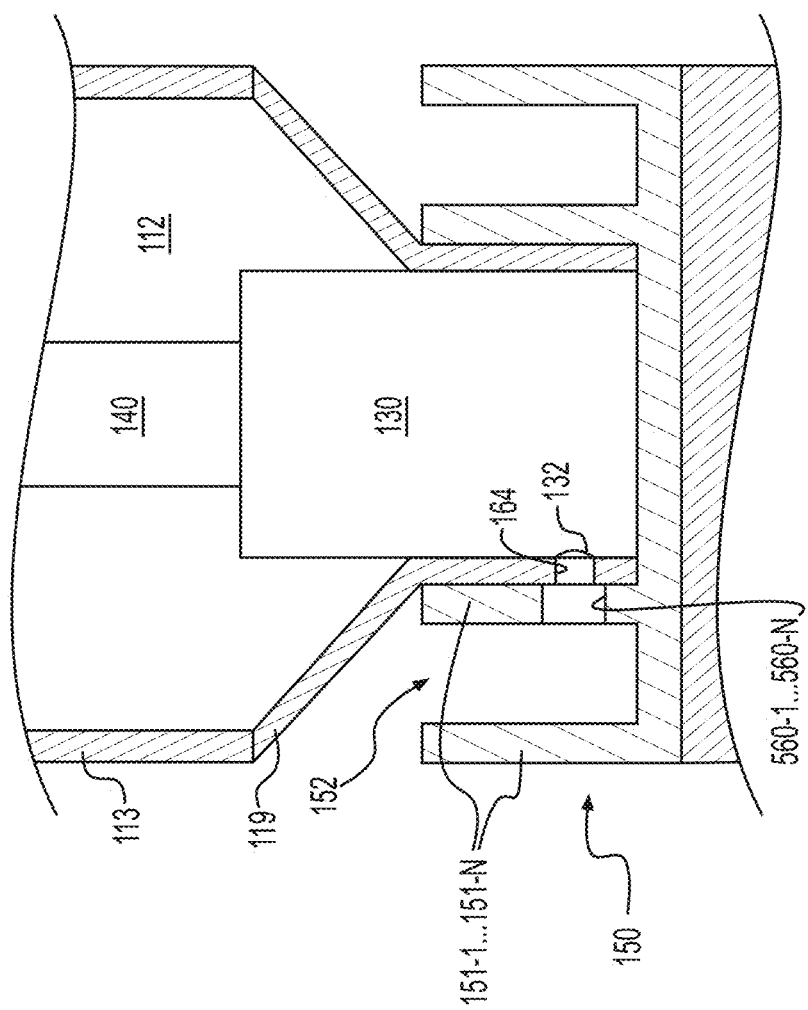
FIG. 4D is a cross-sectional view along line IVB-IVB' of a portion of the e-vaping device of FIG. 4A according to some example embodiments.

FIG. 4A is a perspective view of an e-vaping device according to some example embodiments. FIG. 4B is a cross-sectional view along line IVB-IVB' of a portion of the e-vaping device of FIG. 4A according to some example embodiments. FIG. 4C is a cross-sectional view along line IVC-IVC' of the e-vaping device of FIG. 4B according to some example embodiments. FIG. 4D is a cross-sectional view along line IVB-IVB' of a portion of the e-vaping device of FIG. 4A according to some example embodiments.

As shown in FIGS. 4A-4C, in some example embodiments, the air intake assembly 150 may include one or more structural elements 151-1 to 151-N that define an entirety of the arcuate air inlet 152, which may be an annular air inlet as shown in FIGS. 4A-4C. In addition, as shown in FIGS. 4A-4C, the air intake assembly 150 may include one or more inlet channels 454 that, rather than extending coaxially in relation to the longitudinal axis 180, instead extend at least partially radially in relation to the longitudinal axis 180 between the arcuate air inlet 152 and the vaporizer assembly 130. As shown in FIGS. 4B-4C, for example, the one or more structural elements 151-1 to 151-N of the air intake assembly 150 may define one or more inlet channels 454 that extend entirely radially between the arcuate air inlet 152 and the one or more inlet ports 132 of the vaporizer assembly 130 through an interior of one or more structural elements 151-1 to 151-N of the air intake assembly 150. But, it will be understood that, in some example embodiments, the one or more inlet channels 454 may extend through the air intake assembly 150 between the arcuate air inlet 152 and an airflow conduit 164 (omitted in FIGS. 4A-4C) that extends through a housing structure 119 between the one or more inlet channels 454 and one or more inlet ports 132 of the vaporizer assembly 130.

As shown in at least FIG. 4D, in some example embodiments, the vaporizer assembly 130 may include multiple inlet ports 132, but example embodiments are not limited thereto. For example, the vaporizer assembly 130 may include a single inlet port 132.

Referring now to FIG. 4D, in some example embodiments, the air intake assembly 150 may include an inlet channel 154 that is arcuate or annular in shape, defined by one or more structural elements 151-1 to 151-N of the air intake assembly 150, such that the top end of the inlet channel 154 is open unobstructed from the arcuate air inlet 152 by one or more structural elements 151-1 to 151-N. As further shown in FIG. 4D, in some example embodiments, the air intake assembly 150 may include one or more radially-extending inlet channels 560-1 to 560-N, that amount to a set of orifices that may be adjustably aligned with the airflow conduit 164 of the e-vaping device 100, where the one or more structural elements 151-1 to 151-N of the air intake assembly 150 may be rotated around the longitudinal axis 180 to adjustably align a selected inlet channel of the inlet channels 560-1 to 560-N with the airflow conduit 164 to implement the functionality of the flow control structure in the absence of a separate inlet channel from the orifices of the flow control structure.

Figure 5A:
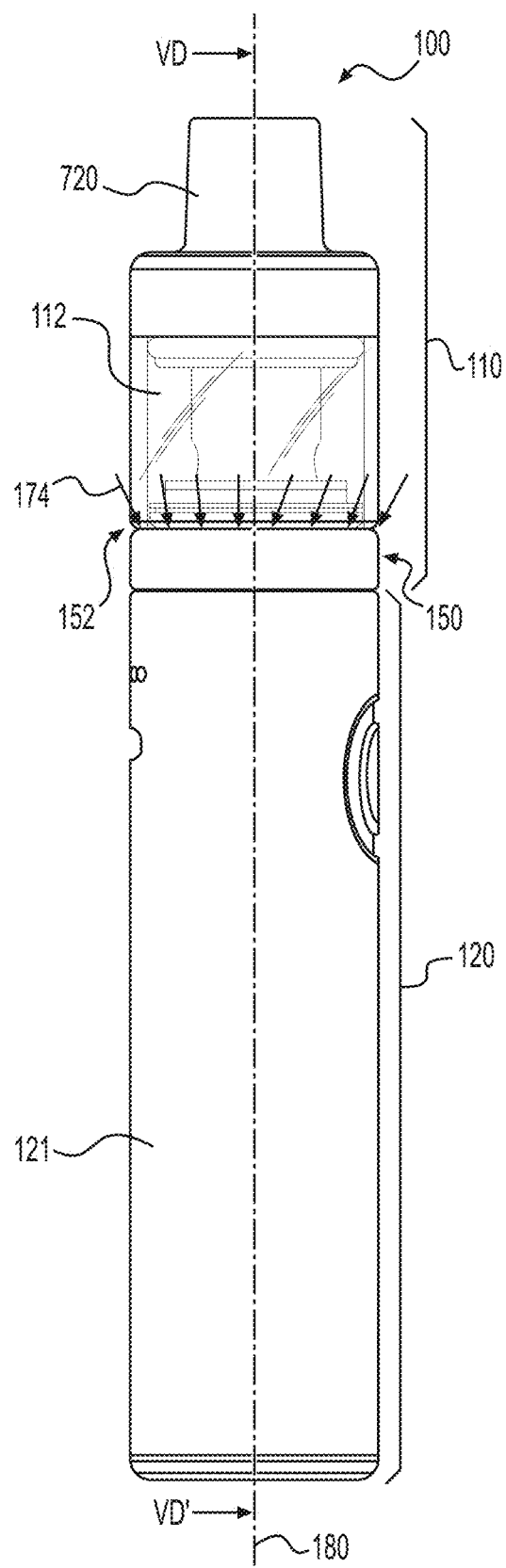
FIG. 5A is a side view of an e-vaping device according to some example embodiments.
Figure 5B:
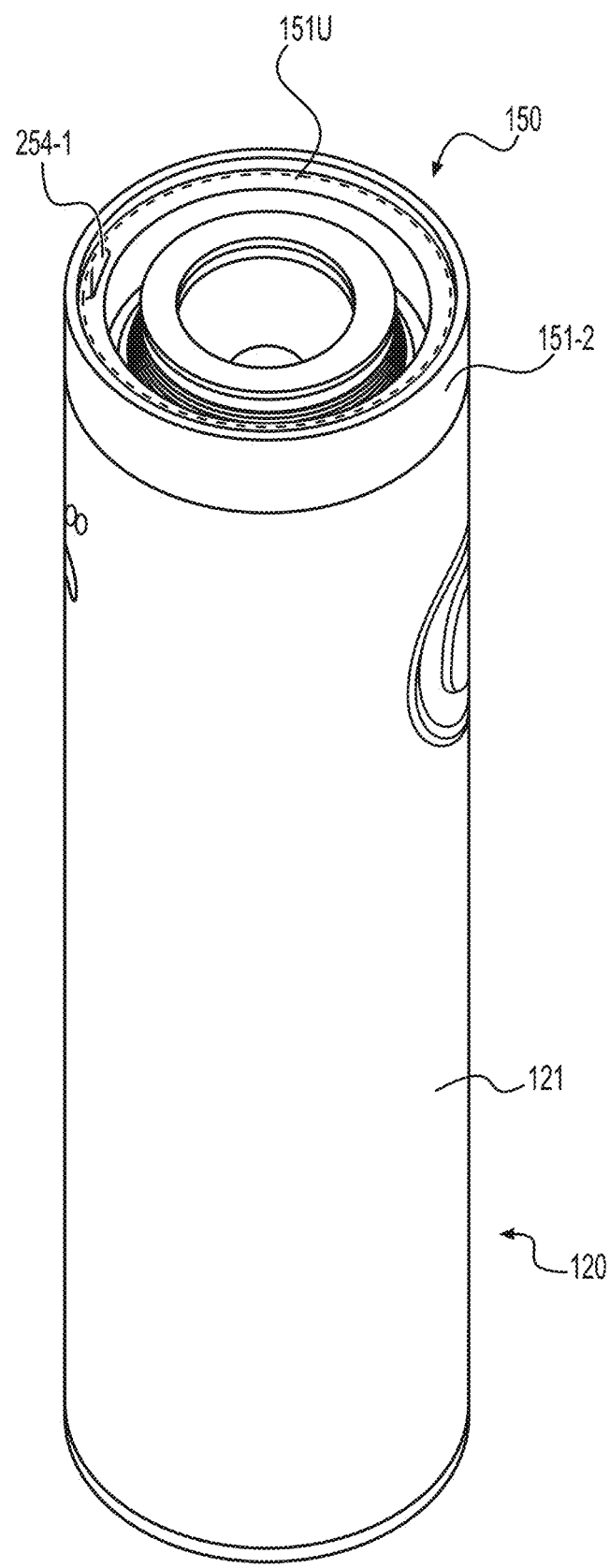
FIG. 5B is a perspective view of a portion of the e-vaping device of FIG. 5A according to some example embodiments.
Figure 5C:
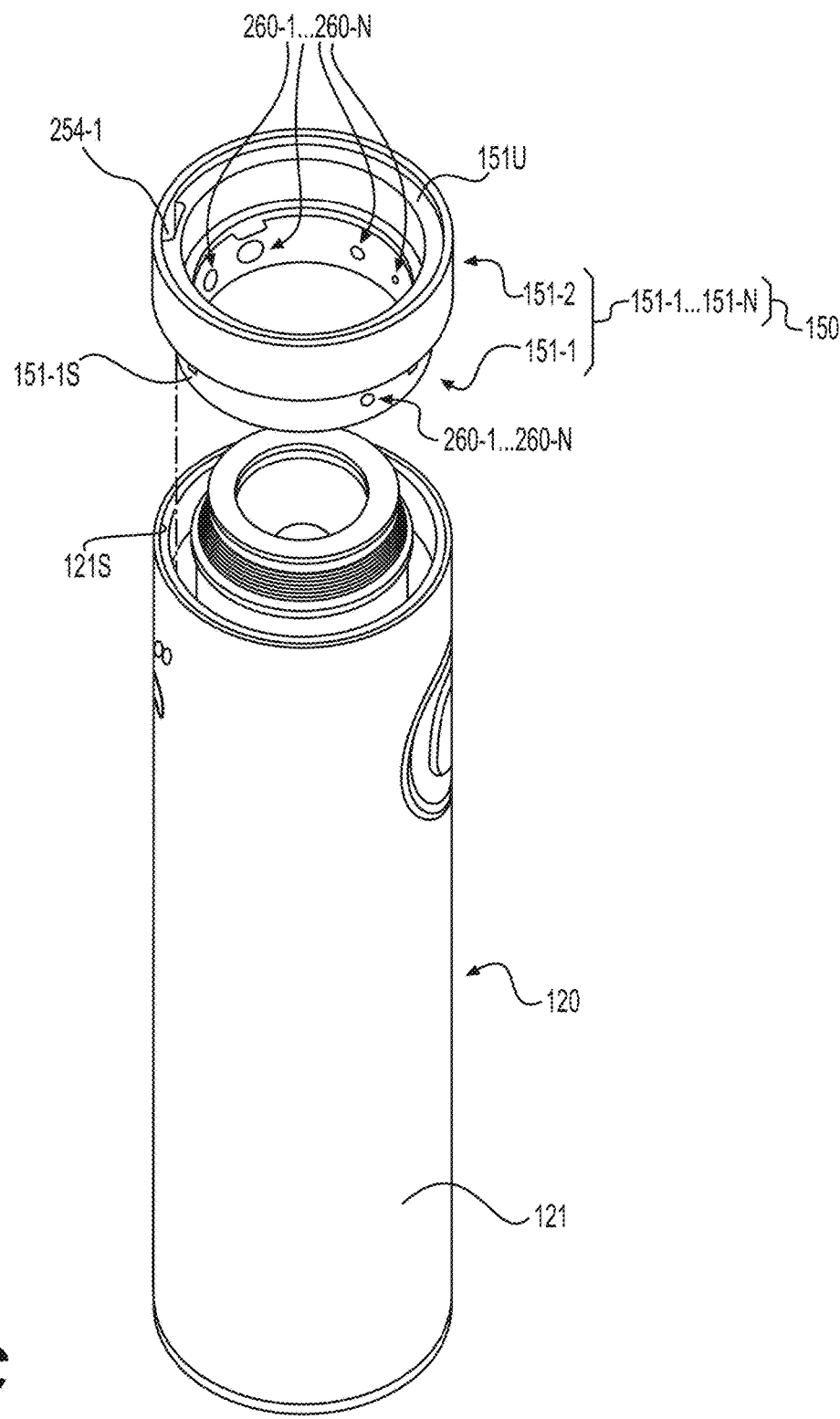
FIG. 5C is a perspective expanded view of a portion of the e-vaping device of FIG. 5A according to some example embodiments.
Figure 5D:
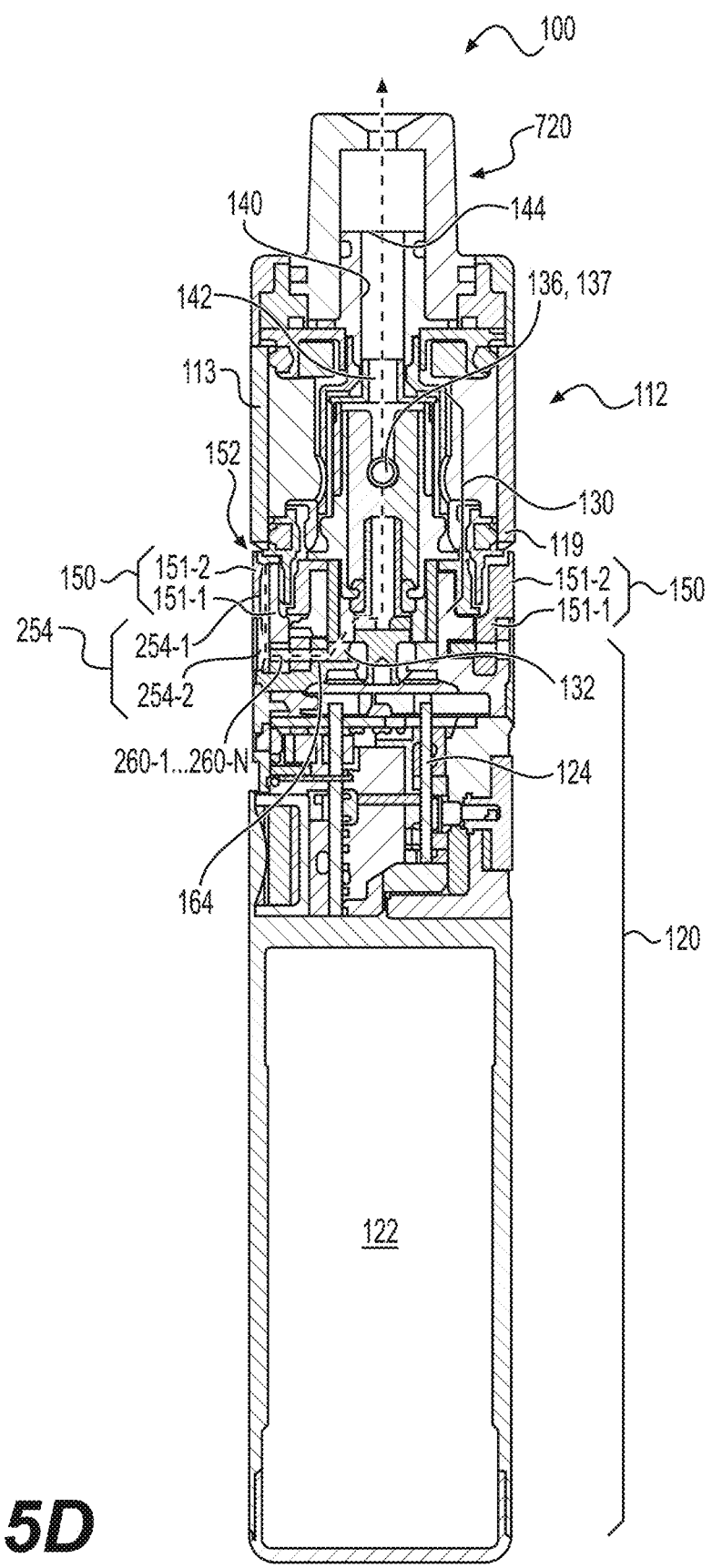
FIG. 5D is a cross-sectional view along line VD-VD' of the e-vaping device of FIG. 5A according to some example embodiments.

FIG. 5A is a side view of an e-vaping device according to some example embodiments. FIG. 5B is a perspective view of a portion of the e-vaping device of FIG. 5A according to some example embodiments. FIG. 5C is a perspective expanded view of a portion of the e-vaping device of FIG. 5A according to some example embodiments. FIG. 5D is a cross-sectional view along line VD-VD' of the e-vaping device of FIG. 5A according to some example embodiments.

As shown in FIGS. 5A-5D, an e-vaping device 100 may include an air intake assembly 150 that is detachable from a remainder of the vapor generator assembly 110, including at least the reservoir 112 and the vaporizer assembly 130. As further shown in at least FIGS. 5B-5D, the air intake assembly 150 may include one or more structural elements 151-1 to 151-N that partially define an arcuate air inlet 152 that is an annular air inlet, define a first portion of a coaxial first inlet channel 154-1 extending from the arcuate air inlet 152, and partially define a coaxial arcuate second inlet channel 154-2 between the air intake assembly 150 and an outer housing 121 of the power supply assembly 120. As further shown, the air intake assembly 150 may include structural elements 151-1 and 151-2, which may be coupled together or may be included in a unitary piece of material. Structural element 151-2 defines an outer structure of the air intake assembly 150 that is exposed to the exterior of the e-vaping device 100. Structural element 151-1 defines an adjustment ring flow control structure 310 that includes multiple orifices 260-1 to 260-N extending through the structural element 151-1. Structural element 151-2 is configured to be rotated around longitudinal axis 180 to cause structural element 151-1 to rotate around longitudinal axis 180 to adjustably align different orifices 260-1 to 260-N with an airflow conduit 164 that is configured to be in fluid communication with the inlet port 132 of the vaporizer assembly 130. As shown in FIGS. 5A-5D, the airflow conduit 164 may extend radially through a portion of the power supply assembly 120, in relation to longitudinal axis 180, such that the power supply assembly 120 is configured to detachably couple with at least the vaporizer assembly 130 to cause the inlet port 132 to be aligned with the airflow conduit 164. When the inlet port 132 is aligned with the airflow conduit 164, the inlet port 132 may be in fluid communication with the airflow conduit 164.

As shown in FIGS. 5A and 5D, when the air intake assembly 150 is coupled with both the power supply assembly 120 and the remainder of the vapor generator assembly 110, the outer surface 151U of the air intake assembly 150, which may be an upper surface of the second structural element 151-2, may collectively define the arcuate air inlet 152 with a beveled portion of the housing structure 119, and a surface 151-1S of the first structural element 151-1 of the air intake assembly 150 may collectively define a second inlet channel 254-2 with an inner surface 121S of the outer housing 121 of the power supply assembly 120, such that the air intake assembly 150 is configured to direct air 174 drawn into the arcuate air inlet 152 to flow through the first inlet channel 254-1 that is entirely defined by second structural element 151-2 of the air intake assembly 150 to the second inlet channel 254-2 that is defined between at least a surface 151-1S of the air intake assembly 150 and an inner surface 121S of the outer housing 121 of the power supply assembly 120.

In some example embodiments, the housing structure 119 may be a portion of the outer housing 121 of the power supply assembly 120, such that the air intake assembly 150 and the power supply assembly 120 may collectively define the arcuate air inlet 152.

In the example embodiments shown in FIGS. 5A-5D, the air intake assembly 150 includes an individual first inlet channel 254-1 and an individual set of orifices 260-1 to 260-N, where the air intake assembly is configured to be rotated to align separate orifices 260-1 to 260-N with an individual airflow conduit 164, but example embodiments are not limited thereto. For example, the air intake assembly 251-1 may include two or more first inlet channels 254-1 that may be spaced apart around the second structural element 151-2 and the first structural element 151-1 may have two, separate sets of orifices 260-1 to 260-N that are configured to be adjustably aligned with separate airflow conduits 164 of two airflow conduits 164 on opposite sides of the vaporizer assembly 130 and in fluid communication with one or more inlet ports 132 of the vaporizer assembly 130.

As shown in FIGS. 5A and 5D, the housing structure 119 may be an integral portion of the reservoir housing 113, such that the housing structure 119 and reservoir housing 113 are included in a unitary piece of material.

As further shown in FIGS. 5A-5D, the e-vaping device 100 may include an outlet assembly 720 that may be coupled to the outlet port 144 of the vapor generator assembly 110, where the outlet assembly 720 may include a channel extending therethrough, such that the outlet assembly 720 establishes fluid communication between the outlet port 144 and an exterior of the e-vaping device 100 through an interior of the outlet assembly 720.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

What is claimed is:

1. A vapor generator assembly for an e-vaping device, the vapor generator assembly comprising:
   a reservoir configured to hold a pre-vapor formulation;
   a vaporizer assembly configured to heat pre-vapor formulation drawn from the reservoir to form a vapor; and
   an air intake assembly configured to direct ambient air into the vaporizer assembly via an inlet port of the vaporizer assembly, the air intake assembly at least partially defining
      an arcuate air inlet that extends at least partially around an outer surface of the vapor generator assembly,
      an adjustment ring structure through which a plurality of orifices having different sizes extend, the adjustment ring structure surrounding at least a portion of the vaporizer assembly, the adjustment ring structure configured to rotate around a longitudinal axis of the vaporizer assembly to adjustably align a selected orifice of the plurality of orifices with the inlet port of the vaporizer assembly to adjustably control a cross-sectional flow area of fluid communication between the arcuate air inlet and the inlet port of the vaporizer assembly, and
   a structural element that defines
      a first outer surface that at least partially defines the arcuate air inlet, and
      a second outer surface that is exposed to an exterior of the vapor generator assembly and is configured to be physically manipulated from the exterior of the vapor generator assembly to cause the intake air assembly to rotate around the longitudinal axis,
   wherein an outer surface of the adjustment ring structure and an inner surface of the structural element at least partially define an annular inlet channel between the arcuate air inlet and the plurality of orifices, the annular inlet channel surrounding the adjustment ring structure, and
   wherein the air intake assembly is configured to establish adjustable fluid communication between the arcuate air inlet and the inlet port of the vaporizer assembly via the annular inlet channel and the selected orifice of the plurality of orifices.

2. The vapor generator assembly of claim 1, wherein the arcuate air inlet is at least partially defined by an arcuate gap between the air intake assembly and an outer housing of the vapor generator assembly.

3. The vapor generator assembly of claim 1, wherein the arcuate air inlet is an annular air inlet that extends around an entirety of the outer surface of the vapor generator assembly.

4. The vapor generator assembly of claim 1, wherein
   the structural element further defines a separate inlet channel extending from the arcuate air inlet at the first outer surface to the inner surface of the structural element, the separate inlet channel extending paraxially in relation to the longitudinal axis of the vapor generator assembly,
   the outer surface of the adjustment ring structure and the inner surface of the structural element at least partially define the annular inlet channel between the separate inlet channel and the plurality of orifices, and
   the air intake assembly is configured to establish the adjustable fluid communication between the arcuate air inlet and the inlet port of the vaporizer assembly via the separate inlet channel, the annular inlet channel, and the selected orifice of the plurality of orifices.

5. An e-vaping device, comprising:
   the vaporizer generator assembly of claim 4; and
   a power supply assembly detachably coupled to the vaporizer generator assembly, the power supply assembly configured to supply electrical power to the vaporizer assembly,
   wherein the power supply assembly includes an outer housing, and at least one inner surface of the outer housing of the power supply assembly at least partially defines an outer annular boundary of the annular inlet channel, such that the annular inlet channel is at least partially defined within an interior of the e-vaping device by respective surfaces of the adjustment ring structure of the air intake assembly, the structural element of the air intake assembly, and the outer housing of the power supply assembly.

6. The e-vaping device of claim 5, wherein the arcuate air inlet is at least partially defined by an arcuate gap between the air intake assembly and an outer housing of the e-vaping device.

7. The e-vaping device of claim 5, wherein the arcuate air inlet is an annular air inlet that extends around an entirety of the outer surface of the e-vaping device.

8. The e-vaping device of claim 5, wherein the power supply assembly includes a rechargeable battery.

\* \* \* \* \*